United States Patent Office 3,577,418
Patented May 4, 1971

3,577,418
PYRAZINAMIDE DERIVATIVES AND PROCESSES FOR THEIR PREPARATION
Edward J. Cragoe, Jr., Lansdale, and Kenneth L. Shepard, Ambler, Pa., assignors to Merck & Co., Inc., Rahway, N.J.
No Drawing. Continuation-in-part of application Ser. No. 718,976, Mar. 21, 1968, which is a continuation-in-part of application Ser. No. 666,004, Sept. 7, 1967. This appplication Feb. 12, 1969, Ser. No. 798,809
Int. Cl. C07d 51/76
U.S. Cl. 260—250       49 Claims

ABSTRACT OF THE DISCLOSURE

A new method is disclosed for the preparation of pyrazinamide derivatives. The process involves reaction of an amine derivative with a very reactive pyrazinoyloxyacrylamide prepared by reaction between a pyrazinoic acid and an isoxazolium salt. The reactivity of the pyrazinoyloxyacrylamide permits the preparation of compounds previously unavailable and hence many of the products are new compounds. The compounds prepared by this process have utility as diuretics.

This application is a continuation-in-part of our copending U.S. application, Ser. No. 718,976 filed Mar. 21, 1968, which in turn is a continuation-in-part of our copending application, Ser. No. 666,004, filed Sept. 7, 1967, both applications having been abandoned.

This invention relates to a new process for the preparation of amide derivatives (III) of pyrazinoic acid, to certain new pyrazinamides (III) and to the intermediate pyrazinoyloxyacrylamides (I). In particular it relates to the process for the preparation of 3-amino-5,6-disubstituted-pyrazinamides, and certain N-derivatives which comprises the reaction of a 3-amino-5,6-disubstituted-pyrazinoyloxyacrylamide with an amine derivative (II). The invention also relates particularly to certain new amide derivatives of 3-amino-5,6-disubstituted-pyrazinoic acids including pyrazinamides, pyrazinoic acid hydrazides, pyrazinolyamidines, 1-pyrazinoyl-3-hydroxy(and alkoxy) guanidines, and pyrazinoylbiguanides. It also relates to the novel intermediate (3-amino-5,6-disubstituted-pyrazinoyloxy)acrylamides. The process is represented by the following Method A:

Method A

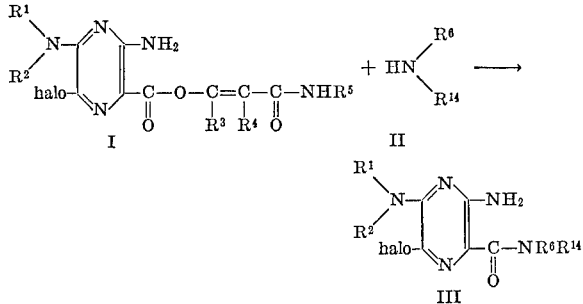

wherein in each of the foreging structures
R¹ represents
(a) Hydrogen,
(b) Lower alkyl of from 1 to about 5 carbon atoms, e.g., methyl, ethyl, propyl, isopropyl, butyl, isobutyl, secondary butyl, tertiary butyl, pentyl, isopentyl, neopentyl and the like,
(c) Lower alkenyl of from 3 to about 5 carbon atoms, e.g., allyl, 2-butenyl, and the like,
(d) Lower alkynyl of from 3 to about 5 carbon atoms, e.g., propargyl and the like, (e) Lower cycloalkyl of from 3 to about 6 carbon atoms, e.g., cyclopropyl, cyclopentyl, cyclohexyl and the like,
(f) Lower cycloalkyl-lower alkyl wherein the cycloalkyl moiety contains from 3 to about 6 carbon atoms and the lower alkyl moiety contains from 1 to about 3 carbon atoms e.g., cyclopropylmethyl, 1- or 2-cyclopropylethyl, 1-, 2- or 3-cyclopropylpropyl, cyclopentylmethyl, 1- or 2-cyclopentylethyl, 1-, 2-, or 3-cyclopentylpropyl, cyclohexylmethyl, 1- or 2-cyclohexylethyl, 1-, 2- or 3-cyclohexylpropyl and the like,
(g) Di(lower alkyl)aminomethyl-lower alkyl, wherein each of the lower alkyl groups has from 1 to about 3 carbon atoms, and can be similar or dissimilar groups selected from methyl, ethyl, propyl and isopropyl e.g., dimethyl-, diethyl-, diisopropyl, dipropyl-, N-methyl-N-ethyl, N-methyl-N-propyl, N-ethyl-N-propyl, and the like,
(h) Hydroxy-lower alkyl, containing from 1 to about 5 hydroxyl groups and from 2 to about 6 carbon atoms e.g., 2-hydroxyethyl, 2, and 3-hydroxypropyl, pentahydroxyhexyl, and the like,
(i) $\omega,\omega,\omega$-Trifluoro-lower alkyl of from 1 to about 3 carbon atoms such as trifluoro-methyl, trifluoroethyl, trifluoropropyl and the like,
(j) Mononuclear aryl-lower alkyl, especially phenyl-lower alkyl, wherein the lower alkyl moiety contains from 1 to about 3 carbon atoms either straight or branched chain, and the phenyl group is either unsubstituted or substituted, with such as halo, e.g., benzyl, phenethyl, 1, 2, or 3-phenylpropyl, fluorobenzyl, fluorophenethyl, chlorobenzyl, chlorophenethyl, and the like,
(k) Heterocyclic-lower alkyl, wherein the heterocyclic moiety is a 5 or 6 membered ring, containing oxygen or nitrogen or both, such as furyl, pyridyl and the like, and the lower alkyl moiety has from 1 to 3 carbon atoms either straight or branched chain, e.g., methyl, ethyl, propyl and the like,
(l) Mononuclear aryl, especially phenyl, either unsubstituted or substituted, such as with halogen, e.g., chloro and fluoro, or lower alkyl of from 1 to 3 carbons such as methyl, ethyl, propyl and the like,
(m) Lower alkoxy of from 1 to about 3 carbon atoms such as methoxy, ethoxy, propoxy, isopropoxy and substituted lower alkoxy such as aryl-lower alkoxy, for example benzyloxy and the like,
(n) Amino.

R² represents (a) hydrogen, (b) lower alkyl of from 1 to about 5 carbon atoms, e.g., methyl, ethyl, propyl, isopropyl, butyl, isobutyl, secondary butyl, tertiary butyl, pentyl, isopentyl, neopentyl and the like.

R¹ and R², when each represents lower alkyl, may be linked together, either directly or through a hetero atom to form a cyclic structure with the nitrogen atom to which they are attached, such as 1-pyrrolidinyl, piperidino, hexahydro-1-azepinyl, 4-methyl-1-piperazinyl, and the like.

R³ represents (a) lower alkyl of from 1 to about 3 carbon atoms, such as methyl, ethyl, propyl, or isopropyl, (b) mononuclear aryl, especially phenyl, either unsubstituted or substituted, with for example lower alkyl such as methyl, ethyl and the like, or with a sulfonate anion o form

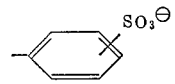

R⁴ represents hydrogen, or a hydrocarbon radical which when linked to R³ forms with the carbon atoms to which R³ and R⁴ are joined an ortho-phenylene group.
R⁵ represents lower alkyl of from 1 to about 5 carbon atoms, e.g., methyl, ethyl, propyl, isopropyl, butyl, isobutyl, secondary butyl, tertiary butyl, pentyl, isopentyl, neopentyl, and the like.

halo represents (a) chloro, (b) bromo, (c) or iodo.

R⁶ represents (a) Lower alkyl of from 1 to about 5 carbon atoms, e.g., methyl, ethyl, propyl, isopropyl, butyl, isobutyl, secondary butyl, tertiary butyl, pentyl, isopentyl, neopentyl, and the like, either unsubstituted or substituted with such as (1) Mono(lower alkoxy)methyl, wherein the lower alkoxy group has from 1 to about 3 carbon atoms, e.g., methoxy, ethoxy, propoxy, isopropoxy and the like, (2) Di(lower alkoxy)methyl, (3) Cyano, (4) Lower alkoxycarbonyl, such as methoxyethoxy-, propoxycarbonyl, and the like, (5) Guanidinocarbonyl, (6) Guanidinoaminocarbonyl, (7) Heterocyclic-lower alkyl-aminocarbonyl, wherein the heterocycle is linked through a nuclear nitrogen atom and contains up to 1 other nuclear hetero atom selected from oxygen and nitrogen, which when nitrogen can be substituted with lower alkyl e.g., morpholino, pyrrolidinyl piperidino, and 4-methylpiperazino, (8) Mononuclear aryl, especially phenyl, (9) Di(lower alkyl)aminomethyl, wherein the lower alkyl groups can be similar or dissimilar, and each has from 1 to about 3 carbons, e.g., methyl, ethyl, propyl and the like,

(10) Heterocyclic aminomethyl, wherein the heterocyclic group is of 5 or 8 atoms containing 1 or 2 nitrogen and/or oxygen atoms such as 2(2-imidazolinyl), and the like,

(11) Heterocyclic of 5 to about 8 atoms containing 1 or 2 oxygen and/or nitrogen atoms, and either unsubstituted or substituted advantageously with lower alkyl having preferably 1 to 3 carbons e.g., 1-pyrrolidinyl, piperidino, hexahydro-1-azepinyl, morpholino, 4-methyl-1-piperazinyl, pyridyl, furyl, tetrahydropyranyl, and the like, (b) Mononuclear aryl, especially phenyl, either unsubstituted or substituted advantageously with halo, e.g., chloro, or bromo, lower alkyl of from 1 to about 3 carbons, e.g., methyl, ethyl, propyl and the like, or lower alkoxy of from 1 to about 3 carbon atoms e.g., methoxy, ethoxy, propoxy, and the like, (c) Lower alkenyl of about 3 to 5 carbon atoms, e.g., allyl, 2-butenyl and the like, (d) Lower alkynyl of about 3 to 5 carbon atoms, e.g., propargyl, and the like, (e) Cyano, (f) Amino, either unsubstituted, or di-substituted with such as lower alkyl of from 1 to about 3 carbon atoms selected from among e.g., methyl, ethyl, propyl and the like, mononuclear aryl-lower alkyl, especially phenyl-lower alkyl, such as benzyl, phenethyl, 1, 2, or 3-phenyl-propyl and the like, or monosubstituted with groups such as a heterocyclic radical such as 2-, 3-, or 4-pyridyl, 2-pyrimidinyl, 2-quinolinyl, and the like, (g) Heterocyclic radical of from 5 to about 8 nuclear members which can contain one nitrogen atom and up to 2 other heteroatoms selected from sulfur, oxygen and nitrogen, e.g., 1-pyrrolidinyl, 1-piperidino, 1-hexahydro-1-azepinyl, morpholino, 4-(3,5-diamino-1,2,4-triazolyl), triazolyl, pyridyl, pyrimidinyl, oxazolinyl, triazolinyl and the like either unsubstituted or substituted with lower alkyl of 1 to about 3 carbon atoms, or phenyl, (h) 

wherein R⁷ represents (1) Lower alkyl of from 1 to about 5 carbon atoms, e.g., methyl, ethyl, propyl, isopropyl, butyl, secondary butyl, tertiary butyl, pentyl, isopentyl, neopentyl, and the like, (2) Mononuclear aryl, especially phenyl, either unsubstituted or substituted with such as halo, e.g., chloro or bromo, lower alkyl of from 1 to about 3 carbon atoms, e.g., methyl, ethyl or propyl, or lower alkoxy of from 1 to about 3 carbon atoms, e.g., methoxy, ethoxy, or propoxy, (j) 

wherein

R⁸ represents (1) hydrogen, (2) lower alkyl of from 1 to about 5 carbon atoms, e.g., methyl, ethyl, propyl, isopropyl, butyl, isobutyl, secondary butyl, tertiary butyl, pentyl, isopentyl, neopentyl and the like, (3) mononuclear aryl, such as phenyl, R⁸ represents (1) hydrogen, (2) lower alkyl of from 1 to about 5 carbon atoms, e.g., methyl, ethyl, propyl, isopropyl, butyl, isobutyl, secondary butyl, tertiary butyl, pentyl, isopentyl, neopentyl, and the like, either unsubstituted or substituted with such as (a) hydroxy, (b) aryl, either mono- or dinuclear aryl, especially phenyl and naphthyl, either unsubstituted or substituted with such as halo, e.g., chloro, bromo, or fluoro or with lower alkyl, e.g., methyl, ethyl, propyl, isopropyl, and the like, or lower alkoxy of from 1 to 3 carbons, e.g., methoxy, ethoxy or propoxy, (c) heterocyclic radical of 5 to about 7 atoms containing 1 or more oxygen and/or nitrogen atoms, e.g., 2-, 3-, or 4-pyridyl, morpholino, 1-pyrrolidyl and the like, (d) lower alkoxy of from 1 to about 3 carbon atoms, e.g., methoxy-ethoxy, propoxy, and the like.

(3) Lower alkenyl of from 3 to about 5 carbon atoms, e.g., allyl, 2-, or 3-butenyl, 2-, 3- or 4-pentenyl and the like, (4) Lower alkylideneamino such as isopropylidene-amino, and the like, (5) Mononuclear aryl-lower alkylideneamino, especially phenylalkylideneamino, e.g., benzylidene-amino, and the like, (6) Hydroxy, (7) Alkoxy, preferably lower alkoxy of from 1 to about 3 carbon atoms, e.g., methoxy, ethoxy, or propoxy, (8) Mononuclear aryl-lower alkoxy, such as benzyloxy, phenethyloxy and the like, (9) Mononuclear aryl, especially phenyl, either unsubstituted or substituted such as with halo, e.g., chloro, bromo or fluoro, lower alkyl, e.g., methyl, ethyl, or propyl, or lower alkoxy, e.g., methoxy, ethoxy, propoxy, or the like,

(10) Cyano, and

(11) Nitro,

R¹⁰ represents (1) hydrogen, (2) lower alkyl of from 1 to about 5 carbon atoms e.g., methyl, ethyl, propyl, isopropyl, butyl, pentyl, isopentyl, neopentyl, and the like, R⁹ and R¹⁰ when lower alkyl can be linked together, either directly or through a hetero atom to form a 5–8 atom cyclic structure with the nitrogen atom to which they are attached e.g., 1-pyrrolidinyl, piperidino, hexahydro-1-azepinyl, morpholino, and the like, and R⁸ and R⁹, when lower alkyl, may be linked together to form a 5–7 atom cyclic structure with the nitrogen atoms to which they are attached, e.g., a 2-(1,3-diaza-2-cycloalkene) such as, 2-(2-imidazolinyl), or 2-(1,4,5,6-tetrahydropyrimidyl), 2-(4,5,6,7-tetrahydro-1H-1,3-diazepinyl) and the like,

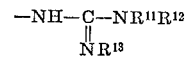

wherein

R¹¹ represents (1) hydrogen, (2) lower alkyl of from 1 to about 5 carbon atoms, e.g., methyl, ethyl, propyl, isopropyl, butyl, isobutyl, secondary butyl, tertiary butyl, pentyl, isopentyl, neopentyl, and the like, R¹² represents (1) hydrogen, (2) lower alkyl of from 1 to about 5 carbon atoms e.g., methyl, ethyl, propyl, isopropyl, butyl, isobutyl, secondary butyl, tertiary butyl, pentyl, isopentyl, neopentyl, and the like, either unsubstituted or substituted with such as hydroxy, mononuclear aryl, e.g., phenyl, halophenyl, or lower alkyl-phenyl, (3) mononuclear aryl, especially phenyl, either unsubstituted or substituted with halo, lower alkyl, or lower alkoxy, and (4) amino.

R¹³ represents hydrogen, or a hydrocarbon radical which when linked to R¹¹ forms a diazacyclic structure with the nitrogen atoms to which they are attached, such as 2-(2-imidazolinyl);

(l)
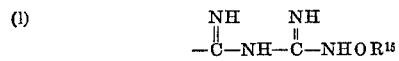

wherein

R¹⁵ represents (1) benzyl, (2) lower alkylbenzyl, wherein the lower alkyl group has from 1 to about 5 carbon atoms such as methyl, ethyl, propyl, butyl and pentyl, either straight or branched chain, (3) halobenzyl, (4) nitrobenzyl, (5) lower alkyl of from 1 to about 8 carbon atoms, such as methyl, ethyl, propyl, butyl, pentyl, heptyl and actyl, either straight or branched chain, (m)

wherein

R¹⁹ represents (1) hydrogen, (2) lower alkyl of 1 to about 3 carbons, (3) mononuclear aryl, especially phenyl, (4) phenyl-lower alkyl, wherein the lower alkyl group has from 1 to about 3 carbon atoms, and R²⁰ represents (1) hydrogen, (2) lower alkyl of from 1 to about 3 carbon atoms, R¹⁴ represents hydrogen or lower alkyl;

R⁶ and R¹⁴ when lower alkyl, can be linked together, either directly to form a saturated heterocycle of 3 to 6 members with the nitrogen atom to which they are attached, or through a hetero atom selected from oxygen and nitrogen to form a saturated 6 membered heterocycle, such as morpholine, 4-methylpiperazine, and the like.

Another embodiment of this invention is the 3-amino-5-NR¹R²-6-halopyrazinoyloxyacrylamides of structural formula,

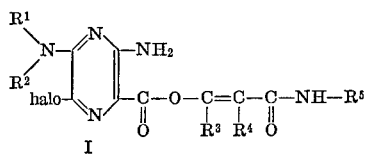

wherein R¹, R², R³, R⁴, R⁵ and halo each have the meaning heretofore assigned. These novel compounds as well as the novel process of this invention are useful in preparing amide derivatives of pyrazinoic acids, which derivatives can be classified as pyrazinamides, pyrazinoic acid hydrazides, pyrazinoylamidines, pyrazinoylguanidines, pyrazinamidoguanidines, pyrazinoylbiguanides, and pyrazinoylsulfamides, which products in turn have utility as diuretic or saluretic agents in the management of conditions that manifest symptoms of excessive water and/or salt retention.

Prior to the present invention many of the pyrazinamides (III) described herein were prepared by reaction of the appropriate amino compound and an alkyl pyrazinoate. However, it was found that often, these esters failed to react or they reacted very slowly. Application of more severe reaction conditions usually only increased the amount of side reactions. Hence, a more reactive derivative of the pyrazinoic acids was required. Surprisingly it was found that the pyrazinoyloxyacrylamides of this invention are extremely reactive derivatives. They are readily prepared by Method B and are readily converted to the amide structures as shown in process A of this invention.

Method B

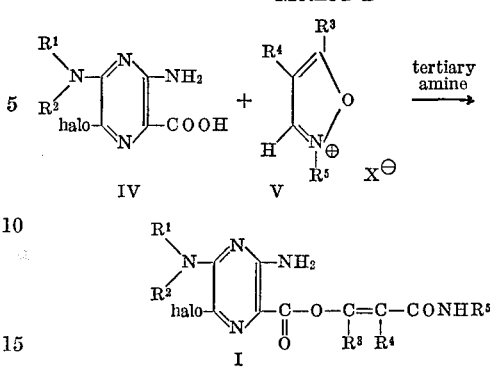

The R's in the above structures have the meanings assigned above. Approximately equivalent amounts of a pyrazinoic acid, IV, an isoxazolium salt, V, and a tertiary amine, are dissolved in a solvent and stirred. Generally the pyrazinoic acid and tertiary amine such as a tri(lower alkyl)amine e.g., trimethylamine, triethylamine, tripropylamine or the like are dissolved in a solvent such as dimethylformamide, dimethyl sulfoxide, dimethyl sufone, acetonitrile, tetrahydrofuran or the like, preferably dimethylformamide or acetonitrile, and stirred for a period of from a few minutes to several hours. The isoxazolium salt then is added and the mixture stirred for from about one to about four hours, usually about two hours at ambient temperature, although gentle heating up to about 50° C. can be employed. The product, I, usually is sufficiently stable to be isolated and purified; it is often isolated simply by diluting the reaction mixture with water which precipitates the pyrazinoyloxyacrylamide. Alternatively, the product (I) may be obtained by evaporation of the reaction mixture. These products then can be recrystallized, usually from a polar organic solvent, such as acetonitrile, isopropyl alcohol or the like.

It is possible, and sometimes preferable, not to isolate these intermediate pyrazinoyloxyacrylamides, but rather to proceed directly with the process of this invention wherein this intermediate is used in situ and converted to the desired substituted pyrazinamide (III). Such reaction is represented by a combination of Method B followed by Method A. In this instance about one hour after the reagents IV and V and the tertiary amine have been mixed, about one to ten equivalents of the amine (II) is added and the reaction mixture is stirred at a temperature from about ambient to about 150° C. for from two to about 24 hours. The resulting amide then is isolated by dilution of the reaction mixture with water, or in some cases with an alcohol such as ethanol or isopropyl alcohol, which precipitates the desired substituted amide.

Where it is found desirable to first isolate the intermediate pyrazinoyloxyacrylamides, (I), the reaction is conducted essentially as described above except that the preformed (I) and the amino compound, (II), are mixed in a molar ratio of from 1:1 to about 1:10 in a solvent such as dimethylformamide, dioxane, dichloromethane, tetrahydrofuran, acetonitrile or t-butyl alcohol, or the like, preferably tetrahydrofuran or acetonitrile and the mixture is stirred for from 2 to about 24 hours at temperatures ranging from ambient to reflux temperature. The time and temperature required depends on the nature of the reactants.

In some instances it has been found necessary to first form the anion of the amine reactant, II, by adding to it an equivalent of a strong base such as sodium hydride.

The intermediate pyrazinoic acids are generally prepared by the hydrolysis of the corresponding methyl esters (VI) as shown below. The hydrolysis is usually carried out using a solution of aqueous base, such as, sodium hydroxide or potassium hydroxide and a solvent such as, isopropyl alcohol, ethanol and the like, and refluxing the mixture for one to 10 hours. The pyrazinoic acid then is isolated by cooling and acidifying the mixture with an acid, such as hydrochloric acid, sufuric acid and the like.

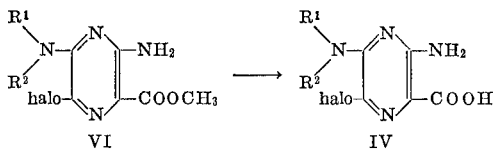

VI        IV

The following examples described the preparations of the various pyrazinoic acid starting materials, the intermediate pyrazinoyloxyacrylamides and the process of this invention by the preparation of several types of substituted amide derivatives, classified as pyrazinamides, pyrazinoic acid hydrazides, pyrazinoylamidines, pyrazinoylguanidines, pyrazinamidoguanidines, pyrazinoylbiguanides and pyrazinoylsulfamides.

PREPARATION OF PYRAZINOIC ACIDS

Example 1

3,5-diamino-6-chloropyrazinoic acid.—A mixture of finely ground methyl 3,5-diamino-6-chloropyrazinoate (101.31 g., 0.50 mole), isopropyl alcohol (1875 ml.) and 5% aqueous sodium hydroxide solution (625 ml.) is heated under reflux, with vigorous stirring, for one hour. Water (7500 ml.) is added to the cooled reaction mixture and the resulting clear solution is made acid to Congo red paper by the addition of concentrated hydrochloric acid. The light yellow solid which separates is collected and dried, yield 92.8 g. (98.4%), M.P. 230–1° C. (dec.). Recrystallization from dimethyl sulfoxide-water gives 3,5-diamino-6-chloropyrazinoic acid, M.P. 272° C. dec.

Analysis.—Calc'd for $C_5H_5ClN_4O_2$ (percent): C, 31.84; H, 2.67; N, 29.71. Found (percent): C, 32.10; H, 2.65; N, 29.57.

Example 2

3-amino-5-(2-propynylamino)-6-chloropyrazinoic acid

Step A: Preparation of methyl 3-amino-5-(2-propynylamino)-6-chloropyrazinoate.—2-propynylamine (3.60 g., 0.065 mole) is added to a suspension of methyl 3-amino-5,6-dichloropyrazinoate (7.20 g., 0.0325 mole) in dimethyl sulfoxide (80 ml.). The resulting clear solution is stirred for one hour and diluted with water (240 ml.). The solid which separates is collected and dried, 7.75 g. (99%), M.P. 160–2° C. Recrystallization from actonitrile gives off-white prisms, M.P. 168–9° C. of methyl 3-amino-5-(2-propynylamino)-6-chloropyrazinoate.

Analysis.—Calc'd for $C_9H_9ClN_4O_2$ (percent): C, 44.92; H, 3.77; N, 23.28. Found (percent): C, 44.82; H, 3.73; N, 23.09.

Step B: Preparation of 3-amino-5-(2-propynylamino)-6-chloropyrazinoic acid.—Utilizing the procedure substantially as described in Example 1, but substituting for the methyl 3,5- diamino-6-chloropyrazinoate employed therein, an equimolar amount of methyl 3-amino-5-(2-propynylamino)-6-chloropyrazinoate there is produced 3-amino-5-(2-propynylamino)-6-chloropyrazinoic acid.

Employing substantially the same procedure as that described in Example 1, but substituting for the methyl 3,5-diamino-6-chloropyrazinoate used therein, equimolecular quantities of the methyl 3-amino-5-$NR^1R^2$-6-halopyrazinoates described in Table I there are produced the 3-amino-5-$NR^1R^2$-6-halopyrazinoic acids also described in Table I.

TABLE I

| Example | $R^1$ | $R^2$ | halo |
|---|---|---|---|
| 3 | H— | H | I |
| 4 | H— | H | Br |
| 5 | $C_2H_5$— | H | Cl |
| 6 | $CH_2=CH-CH_2$— | H | Cl |
| 7 | cyclopropyl— | H | Cl |
| 8 | cyclopropyl-$CH_2$— | H | Cl |
| 9 | $(CH_3)_2N(CH_2)_2$— | H | Cl |
| 10 | $HOCH_2CH_2$— | H | Cl |
| 11 | $HOCH_2-(CHOH)_4-CH_2$— derived from D:glucamine). | H | Cl |
| 12 | $CF_3CH_2$— | H | Cl |
| 13 | phenyl-$CH_2$— | H | Cl |
| 14 | (F-phenyl)-$CH_2$— | H | Cl |
| 15 | furfuryl-$CH_2$— | H | Cl |
| 16 | phenyl— | H | Cl |
| 17 | Cl-phenyl— | H | Cl |
| 18 | $CH_3O$— | $CH_3$— | Cl |
| 19 | $NH_2$— | $CH_3$— | Cl |
| 20 | $CH_3$— | $CH_3$— | Cl |
| 21 | $(CH_2)_4$ | | Cl |

PREPARATION OF PYRAZINOYLOXYACRYLAMIDES

Example 22

N-(t-butyl)-3-methyl-3-(3,5-diamino-6-chloropyrazinoyloxy)-acrylamide.—A mixture of 3,5-diamino-6-chloropyrazinoic acid (1.90 g., 0.01 mole) and triethylamine (1.0 g., 0.01 mole) in dimethylformamide (20 ml.) is stirred for 10 minutes. N-(t-butyl)-5-methyl-isoxazolium perchlorate (2.40 g., 0.01 mole) is added and the resulting solution stirred for 2 hours. Water (100 ml.) is added and the solid which separates is collected and dried. The yield is 2.85 g. (87%); M.P. 171–6° C. Recrystallization from acetonitrile gives light yellow crystals, M.P. 187–9° C., of N-(t-butyl)-3-methyl-3-(3,5-diamino-6-chloropyrazinoyloxy)acrylamide.

Analysis.—Calc'd for $C_{13}H_{18}ClN_5O_3$ (percent): C, 47.63; H, 5.53; N, 21.37. Found (percent): C, 47.87; H, 5.55; N, 21.42.

Employing the procedure substantially as described in Example 22, but substituting for the 3,5-diamino-6-chloropyrazinoic acid and the N-(t-butyl)-5-methyl-isoxazolium perchlorate utilized therein, equivalent amounts of 3-amino-5-$NR^1R^2$-6-halopyrazinoic acid and N-$R^5$-5-$R^3$-4-$R^4$-isoxazolium salt respectively which are described in Table II, there are produced the N-$R^5$-2-$R^4$-3-$R^3$-3-(3-amino-5-$NR^1R^2$-6-halo-pyrazinoyloxy)acrylamides, also described in Table II.

TABLE II $$R^1R^2N\text{-pyrazine(halo)-COOH} + \text{isoxazolium salt} \xrightarrow{(C_2H_5)_3N} R^1R^2N\text{-pyrazine(halo)-C(O)-O-C(R^3)=C(R^4)-CONH-R^5}$$

| Example | R¹ | R² | R³ | R⁴ | R⁵ | X⁻ | halo |
|---|---|---|---|---|---|---|---|
| 23 | H | H | ⁻O₃S-C₆H₄- | H | CH₃CH₂- | —(¹) | I |
| 24 | H | H | C₆H₅- | H | (CH₃)₃C- | ClO₄⁻ | Br |
| 25 | CH₂=CH-CH₂- | H | -CH=CH-CH=CH-(²) | | CH₃- | O₂N-C₆H₃(NO₂)-SO₃⁻ | Cl |
| 26 | HC≡C-CH₂- | H | CH₃- | H | (CH₃)₃C- | ClO₄⁻ | Cl |
| 27 | cyclopentyl | H | Same | H | Same | Same as above | Cl |
| 28 | cyclopropyl-CH₂- | H | ⁻O₃S-C₆H₄- | H | CH₃CH₂- | —(¹) | Cl |
| 29 | (CH₃)₂N(CH₂)₂- | H | CH₃- | H | (CH₃)₃C- | ClO₄⁻ | Cl |
| 30 | HOCH₂CH₂- | H | Same | H | Same | Same as above | Cl |
| 31 | HOCH₂(CHOH)₄CH₂ | H | -CH=CH-CH=CH-(²) | | CH₃- | O₂N-C₆H₃(NO₂)-SO₃⁻ | Cl |
| 32 | CF₃CH₂- | H | C₆H₅- | H | (CH₃)₃C- | ClO₄⁻ | Cl |
| 33 | C₆H₅-CH₂- | H | CH₃- | H | Same | Same as above | Cl |
| 34 | 4-F-C₆H₄-CH₂ | H | ⁻O₃S-C₆H₄- | H | CH₃CH₂- | —(¹) | Cl |
| 35 | furyl-CH₂- | H | CH₃- | H | (CH₃)₃C- | ClO₄⁻ | Cl |
| 36 | C₆H₅- | H | Same | H | Same | Same as above | Cl |
| 37 | Cl-C₆H₄- | H | -CH=CH-CH=CH-(²) | | CH₃- | O₂N-C₆H₃(NO₂)-SO₂⁻ | Cl |
| 38 | CH₃O- | CH₃- | C₆H₅- | H | (CH₃)₃C- | ClO₄⁻ | Cl |
| 39 | NH₂- | | Same | CH₃- | H | Same | Same as above | Cl |
| 40 | -(CH₂)₄- | | Same | | H | do | do | Cl |
| 40(a) | CH₃- | | CH₃- | do | H | do | ClO₄⁻ | Cl |
| 40(c) | C₂H₅- | | H | do | H | do | Same as above | Cl |

¹ The anion appears as part of the R³ substituent; the product appears as the triethyl ammonium salt.
² This compound is not strictly an acrylamide but rather N-R⁵-2-(3-amino-5-N R¹R²-6-halopyrazinoyloxy) benzamide.

PREPARATION OF PYRAZINAMIDES

Example 41

N - ethyl - 3,5 - diamino - 6 - chloropyrazinamide.—N-(t - butyl) - 3 - methyl - 3 - (3,5 - diamino - 6 - chloropyrazinoyloxy)acrylamide (0.10 g., 0.3 mole) is dissolved in a minimum amount of tetrahydrofuran. A 70% ethylamine in water solution (1.0 ml.) is added and the solution is refluxed for five minutes. The solvent is removed under reduced pressure and the residue is treated with water (5 ml.). The solid which crystallizes on standing is collected and dried, 0.05 g. (76%), M.P. 204–6° C. Recrystallization from benzene gives N-ethyl-3,5-diamino-6-chyoropyrazinamide, which melts at 205–206° C.

Analysis.—Calc'd for $C_7H_{10}ClN_5O$ (percent): C, 38.98; H, 4.67; N, 32.48. Found (percent): C, 38.65; H, 4.60; N, 33.28.

Example 42

N - ethoxycarbonylmethyl - 3,5 - diamino - 6 - chloropyrazinamide.—Ethyl glycinate hydrochloride (5.60 g., 0.04 mole) is dissolved in a mixture of water (50 ml.) and sodium bicarbonate (5.0 g., 0.06 mole). A solution of N - (t - butyl) - 3 - methyl - 3 - (3,5 - diamino - 6-chloropyrazinoyloxy)acrylamide (3.27 g., 0.01 mole) in tetrahydrofuran (100 ml.) is added and the mixture warmed on the steam bath for two hours. Water (500 ml.) is added and the solution chilled. The solid which precipitates is collected and dried, 2.17 g. (80%), M.P. 172–4° C. After purification is effected by recrystallization from isopropyl alcohol the N-ethoxycarbonylmethyl-3,5-diamino-6-chloropyrazinamide melts at 174–175° C.

*Analysis.*—Calc'd for $C_9H_{12}ClN_5O_3$ (pecent): C, 39.49; H, 4.42; N, 25.59. Found (percent): C, 39.77; H, 4.38; N, 25.45.

Employing substantially the method as described in Example 42, but substituting for the ethyl glycinate hydrochloride used therein, an equivalent amount of aminoacetonitrile hydrogen sulfate or methyl glycerinate hydrochloride or propyl glycinate hydrochloride there is produced N-cyanomethyl-3,5-diamino-6-chloropyrazinamide, N-methoxycarbonylmethyl-3,5-diamino-6-chloropyrazinamide or N-propoxycarbonylmethyl-3,5-diamino-6-chloropyrazinamide, respectively.

Example 43

N-(2-morpholinoethyl)-3,5-diamino-6-chloropyrazinamide.—A solution of N-(t-butyl)-3-methyl-3-(3,5-diamino-6-chloropyrazinoyloxy)acrylamine (3.27 g., 0.01 mole) and 2-morpholinoethylamine (1.50 g., 0.0115 mole), in tetrahydrofuran is refluxed for 2 hours. The tetrahydrofuran is removed under reduced pressure and the residue is suspended in hexane (40 ml.) and filtered, 3.0 g. (100%), M.P. 153–66° C. Recrystallization of the N-(2-morpholinoethyl)-3,5-diamino-6-chloropyrazinamide from absolute ethanol gives material melting at 178–80° C.

*Analysis.*—Calc'd for $C_{11}H_{17}ClN_6O_2$ (percent): C, 43.93; H, 5.70; N, 27.95. Found (percent): C, 44.22; H, 5.68; N, 27.84.

Example 44

N-phenyl-3,5-diamino-6-chloropyrazinamide.—A mixture of N-(t-butyl)-3-methyl-3-(3,5-diamino-6-chloropyrazinoyloxy)acrylamide (3.27 g., 0.01 mole), aniline (4.65 g., 0.05 mole) and n-amyl alcohol (20 ml.) is heated to reflux. The resulting solution is refluxed for 24 hours and filtered while hot to remove some insoluble solid. The filtrate is evaporated under reduced pressure and the oily residue is dissolved in dichloromethane (50 ml.). This solution is extracted with 1 N hydrochloric acid (two 20 ml. portions), the dichloromethane is dried over anhydrous magnesium sulfate then is evaporated under reduced pressure. The residue is triturated with butyl chloride to give 0.30 g. of N-phenyl-3,5-diamino-6-chloropyrazinamide, M.P. 193–7° C. Recrystallization from cyclohexane gives material melting at 198–202° C.

*Analysis.*—Calc'd for $C_{11}H_{10}ClN_3O$ (percent): C, 50.10; H, 3.82; N, 26.56. Found (percent): C, 49.98; H, 3.84; N, 26.39.

Employing substantially the methods as described in Examples 41, 43 and 44, but substituting for the n-(t-butyl)-3-methyl-3-(3,5-diamino-6-chloropyrazinoyloxy) acrylamide and the amines used therein, equivalent amounts of $N-R^5-2-R^4-3-R^3-3-(3\text{-amino-}5-NR^1R^2-6\text{-halo-}$ pyrazinoyloxy)acrylamide and $H_2NR^6$ respectively which are described in Table III, there are produced the $N-R^6-3-$ amino-5-$NR^1R^2$-6-halo-pyrazinamides, also described in Table III.

TABLE III

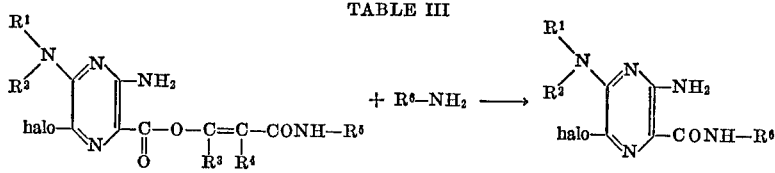

| Example: | R¹ | R² | R³ | R⁴ | R⁵ | R⁶ | halo |
|---|---|---|---|---|---|---|---|
| 45 | H | H | CH₃— | H | (CH₃)₃C— | CH₃\N—(CH₂)₂—/n-C₃H₇ | Cl |
| 46 | H | H | ⁻O₃S—⟨phenyl⟩— | H | CH₃CH₂— | CH₃OCH₂CH₂— | I |
| 47 | H | H | ⟨phenyl⟩— | H | (CH₃)₃C— | ⟨phenyl⟩—CH₂— | Br |
| 48 | CH₂=CH—CH₂— | H | —CH=CH—CH=CH— | | CH₃— | (CH₃)₂N(CH₂)₂—  (H on N) | Cl |
| 49 | HC≡C—CH₂— | H | CH₃— | H | (CH₃)₃C— | ⟨imidazole⟩—NH(CH₂)₂— | Cl |
| 50 | ⟨cyclopentyl⟩ | H | Same | H | Same | ⟨piperidine⟩N—(CH₂)₂— | Cl |
| 51 | ⟨cyclopropyl⟩—CH₂— | H | ⁻O₃S—⟨phenyl⟩— | H | CH₃CH₂— | ⟨piperidine⟩N—(CH₂)₂— | Cl |
| 52 | (CH₃)₂N(CH₂)₂— | H | CH₃— | H | (CH₃)₃C— | ⟨piperidine⟩N—(CH₂)₂— | Cl |
| 53 | HOCH₂CH₂— | H | Same | H | Same | CH₃—N⟨piperazine⟩N—(CH₂)₂— | Cl |
| 54 | HOCH₂(CHOH)₄CH₂— | H | —CH=CH—CH=CH— | | CH₃— | ⟨phenyl⟩— | Cl |
| 55 | CF₃CH₂— | H | ⟨phenyl⟩— | | H | (CH₃)₃C— | Cl—⟨phenyl⟩— | Cl |

TABLE III.—Continued

| Example: | R¹ | R² | R³ | R⁴ | R⁵ | R⁶ | halo |
|---|---|---|---|---|---|---|---|
| 56 | (phenyl)-CH₂— | H | CH₃— | H | Same | CH₃-(phenyl)- | Cl |
| 57 | (F-phenyl)-CH₂— | H | ⊖O₃S-(phenyl)- | H | CH₃CH₂— | CH₃O-(phenyl)- | Cl |
| 58 | (furyl)-CH₂— | H | CH₃— | H | (CH₃)₃C— | CH₃CH₂— | Cl |
| 59 | (Cl-phenyl)- | H | —CH=CH—CH=CH— | | CH₃— | CH₂=CHCH₂— | Cl |
| 60 | CH₃O— | CH₃— | (phenyl) | H | (CH₃)₃C— | CH≡CCH₂— | Cl |
| 61 | NH₂— | CH₃— | CH₃— | H | Same | (morpholinyl)N—(CH₂)₂— | Cl |
| 62 | —(CH₂)₄— | | Same | H | do | CH₃CH₂— | Cl |
| 63 | H | H | do | H | do | C₂H₅OCH₂CH₂— | Cl |
| 64 | H | H | do | H | do | i-C₃H₇OCH₂CH₂— | Cl |
| 65 | H | H | do | H | do | (furyl)-CH₂— | Cl |
| 66 | H | H | do | H | do | (pyridyl)-CH₂— | Cl |

PREPARATION OF PYRAZINOIC ACID HYDRAZIDES

Example 67

3,5-diamino - 6 - chloropyrazinoic acid, 2,2-tetramethylenehydrazide.—A mixture of 1-aminopyrrolidine (2.15 g., 0.025 mole), N-(t-butyl)-3-methyl-3-(3,5-diamino-6-chloropyrazinoyloxy)acrylamide (6.56 g., 0.02 mole) and acetonitrile (100 ml.) is heated under reflux for 2 hours. The solid which separates is collected and dried, 3.45 g. (67%), M.P. 222–4.5° C. Recrystallization from acetonitrile gives 3,5-diamino-6-chloropyrazinoic acid, 2,2-tetramethylenehydrazide, M.P. 224–5.5° C.

*Analysis.*—Calc'd for $C_9H_{13}ClN_6O$ (percent): C, 42.11; H, 5.10; N, 32.74. Found (percent): C, 42.44; H, 4.88; N, 32.38.

Example 68

3,5-diamino - 6 - chloropyrazinoic acid, 2-(2-pyridyl) hydrazide.—A mixture of 2-hydrazinopyridine (2.18 g., 0.02 mole), N-(t-butyl)-3-methyl-3-(3,5-diamino-6-chloropyrazinoyloxy)acrylamide (3.39 g., 0.01 mole) and acetonitrile (75 ml.) is heated under reflux for 3 hours. The solid that separates is collected and dried, 2.21 g. (79%), M.P. 283–6° C. dec. This sample is further purified by dissolving in dilute methanesulfonic acid and reprecipitating by the addition of 10% sodium hydroxide solution to give 3,5-diamino-6-chloropyrazinoic acid, 2-(2-pyridyl)hydrazide, M.P. 286–90° C. dec.

*Analysis.*—Calc'd for $C_{10}H_{10}ClN_7O$ (percent): C, 42.94; H, 3.60; N, 35.06. Found (percent): C, 42.75; H, 3.96; N, 34.75.

Example 69

3,5-diamino-6-chloropyrazinoic acid, 2-(2-pyrimidinyl)-hydrazide hydrate.—A mixture of 3,5-diamino-6-chloropyrazinoic acid (1.90 g., 0.01 mole) and triethylamine (1.0 g., 0.01 mole) in dimethylformamide (20 ml.) is stirred for 10 minutes. To this solution is added N-(t-butyl)-5-methylisoxazolium perchlorate (2.40 g., 0.01 mole) and the resulting solution is stirred for one hour. A solution of 2-hydrazinopyrimidine (4.40 g., 0.04 mole) in dimethylformamide (20 ml.) is added, the solution is stirred 4 hours then warmed on the steam bath for 3 hours. Water (200 ml.) is added and the solid which separates is collected and dried. The yield is 2.25 g. (80.5%); M.P. 257–260° C. Recrystallization from 80% acetonitrile gives light tan crystals, M.P. 262–3° C. of 3,5-diamino-6-chloropyrazinoic acid, 2-(2-pyrimidinyl)hydrazide hydrate.

*Analysis.*—Calc'd for $C_9H_9ClN_8O \cdot H_2O$ (percent): C, 36.19; H, 3.71; N, 37.52. Found (percent): C, 36.18; H, 3.75; N, 37.74.

Example 70

3,5-diamino - 6 - chloropyrazinoic acid, 2,2-hexamethylenehydrazide.—A solution of 1-aminohomopiperidine (4.56 g., 0.04 mole) and N-(t-butyl)-3-methyl-3-(3,5-diamino-6-chloropyrazinoyloxy)acrylamide (3.28 g., 0.01 mole) in tetrahydrofuran (50 ml.) is refluxed for 24 hours. The solvent is removed under reduced pressure and the residual oil is dissolved in isopropyl alcohol (100 ml.). The solid which separates on cooling is collected and dried, 1.06 g., (37%) M.P. 181–90° C. Recrystallization from acetonitrile gives 3,5-diamino-6-chloropyrazinoic acid, 2,2-hexamethylenehydrazide, melting at 190–192° C.

*Analysis.*—Calc'd for $C_{11}H_{17}ClN_6O$ (percent): C, 46.39; H, 6.02; N, 29.52. Found (percent): C, 46.80; H, 5.85; N, 29.96.

EXAMPLE 71

3,5-diamino-6-chloropyrazinoic acid, 2,2-pentamethylenehydrazide.—A mixture of 3,5-diamino-6-chloropyrazinoic acid (3.80 g., 0.02 mole) and triethylamine (2.0 g., 0.02 mole) in dimethylformamide (40 ml.) is stirred for 10 minutes. To this solution is added N-(t-butyl)-5-methylisoxazolium perchlorate (4.80 g., 0.02 mole) and the resulting solution is stirred for one hour. 1-aminopiperidine (5.2 g., 0.052 mole) is added and the solution is warmed on the steam bath for four hours. Isopropyl alcohol (250 ml.) is added and the solid which separates on cooling is collected and dried, 2.22 g. (41%), M.P. 238–43° C. Recrystallization from acetonitrile gives yellow crystals of 3,5-diamino-6-chloropyrazinoic acid, 2,2-pentamethylenehydrazide, M.P. 244–45° C.

*Analysis.*—Calc'd for $C_{10}H_{15}ClN_6O$ (percent): C, 44.36; H, 5.59; N, 31.05. Found (percent): C, 44.52; H, 5.28; N, 31.37.

Example 72

3,5-diamino-4-(3,5-diamino - 6 - chloropyrazinamido)-4H-1,2,4-triazole hemihydrate.—A mixture of 3,5-diamino-6-chloropyrazinoic acid (1.90 g., 0.01 mole) and triethylamine (1.0 g., 0.01 mole) in dimethylformamide (20 ml.) is stirred for 10 minutes. To this solution is added N-(t-butyl)-5-methylisoxazolium perchlorate (2.40 g., 0.01 mole) and the resulting solution is stirred for one hour. A mixture of 3,4,5-triamino-4H-1,2,4-triazole (3.06 g., 0.03 mole) and dimethylformamide (10 ml.) is added and the reaction mixture is warmed on the steam bath for 16 hours. Water (200 ml.) is added and the solid which precipitates is collected and dried; yield 1.50 g. (51%), gradual decomposition over 200° C. Recrystallization from water gives brown crystals of 3,5-diamino-4-(3,5-diamino - 6 - chloropyrazinamido)-4H-1,2,4-triazole hemihydrate, M.P. 275–8° C., dec.

Analysis.—Calc'd for $C_7H_9ClN_{10}O \cdot \frac{1}{2}H_2O$ (percent): C, 28.63; H, 3.43; N, 47.70. Found (percent): C, 28.58; H, 3.37; N, 47.45.

Employing substantially the process as described in Examples 67, 68 and 70 but substituting for the 1-aminopyrrolidine, 2-hydrazinopyridine and 1-aminohomopiperidine respectively and the N-(t-butyl)-3-methyl-3-(3,5-diamino - 6 - chloropyrazinoyloxy)acrylamide used therein equivalent amounts of the $NH_2$-$R^6$ and N-$R^5$-2-$R^4$-3-$R^3$-3-(3-amino-5-$NR^1R^2$-6-halopyrazinoyloxy)acrylamide, identified in Table IV there are produced the 3-amino-5-$NR^1R^2$-6-halopyrazinoic acid, hydrazides also described in Table IV.

PREPARATION OF PYRAZINOYLAMIDINES

Example 83

N - (3,5-diamino - 6-chloropyrazinoyl)benzamidine.— Sodium hydroxide (1.20 g., 0.03 mole) is dissolved in water (30 ml.) and benzamidine hydrochloride (5.60 g., 0.036 mole) is added. This solution is stirred two minutes, N-(t-butyl)-3 - methyl - 3 - (3,5-diamino-6-chloropyrazinoyloxy)acrylamide (3.28 g., 0.01 mole) is added and the mixture stirred for 2 hours. The solid is collected, dried and recrystallized from acetonitrile to give 0.83 g. (29%), M.P. 220–4° C. dec. Recrystallization from ethanol-acetonitrile gives N-(3,5-diamino - 6 - chloropyrazinoyl)benzamidine, M.P. 221–224° C. dec.

Analysis.—Calc'd for $C_{12}H_{11}ClN_6O$ (percent): C, 49.57; H, 3.81; N, 28.91. Found (percent): C, 49.95; H, 3.90; N, 29.12.

Employing substantially the same procedure as described in Example 83, but substituting for the benzamidine hydrochloride employed therein, an equivalent amount of p-chlorobenzamidine hydrochloride, acetamidine hydrochloride valeramidine hydrochloride, p-methylbenzamidine, hydrochloride or m-ethoxybenzamidine hydrochloride there is produced N-(3,5 - diamino-6-chloropyrazin-

TABLE IV

| Example | $R^1$ | $R^2$ | $R^3$ | $R^4$ | $R^5$ | $R^6$ | halo |
|---|---|---|---|---|---|---|---|
| 73 | H | H | $CH_3$— | H | $(CH_3)_3C$— | $NH_2$— | Cl |
| 74 | $CH_3$— | $CH_3$— | $CH_3$— | H | Same | $(CH_3)_2N$— | Cl |
| 75 | $C_2H_5$— | H | $CH_3$— | H | do | $CH_3$-N-benzyl-$CH_3$ | Cl |
| 76 | H | H | $^{\ominus}O_3S$-phenyl- | H | $CH_3CH_2$— | pyridyl-NH— | I |
| 77 | H | H | phenyl- | H | $(CH_3)_3C$— | piperidyl-N— | Br |
| 78 | $CH_2=CH$-$CH_2$— | H | —CH=CH—CH=CH— | $CH_3$— | piperidyl-N— | Cl |
| 79 | HC≡C—$CH_2$— | H | $CH_3$— | H | $(CH_3)_3C$— | Same as above | Cl |
| 80 | cyclopentenyl | H | Same as above | H | Same | diaminotriazinyl | Cl |
| 81 | cyclopropyl-$CH_2$— | H | $^{\ominus}O_3S$-phenyl- | H | $CH_3CH_2$— | morpholinyl-N— | Cl |
| 82 | H | H | $CH_3$— | H | $(CH_3)_3C$— | quinolyl-NH— | Cl |

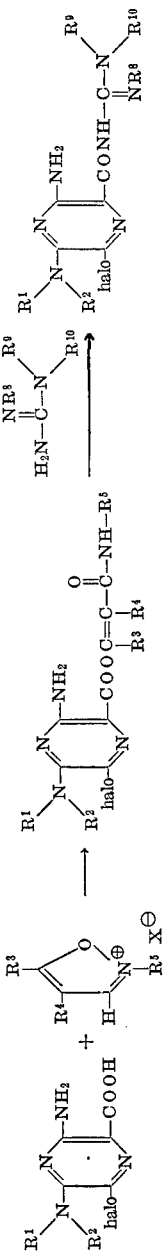

oyl)-p-chlorobenzamidine, N-(3,5 - diamino 6 - chloropyrazinoyl)acetamidine, N-(3,5 - diamino - 6 - chloropyrazinoyl)valeramidine, N - (3,5 - diamino-6-chloropyrazinoyl) - p - methylbenzamidine, and N-(3,5-diamino-6-chloropyrazinoyl) - m - ethoxybenzamidine respectively.

PREPARATION OF PYRAZINOYLGUANIDINES

Example 84

(3.5 - diamino - 6 - chloropyrazinoyl)guanidine hydrochloride dihydrate.—A mixture of 3,5-diamino-6-chloropyrazinoic acid (1.90 g., 0.01 mole) and triethylamine (1.0 g., 0.01 mole) in dimethylformamide (20 ml.) is stirred for 10 minutes N-(t-butyl)-5-methylisoxazolium perchlorate (2.40 g., 0.01 mole) is added and the resulting solution is stirred for 1 hour.

Sodium (1.15 g., 0.05 mole) is dissolved in absolute ethanol (50 ml.). Guanidine hydrochloride (4.75 g., 0.05 mole) is added and the mixture stirred for one-half hour. The mixture is filtered and the filtrate evaporated under reduced pressure. The residue is dissolved in dimethylformamide (10 ml.) and added to the above solution. This reaction mixture is stirred for 24 hours, poured into water (100 ml.) and chilled. The solid which separates is collected and dried. The yield is 0.88 g., M.P. 229–233° C. dec.

The product is dissolved in a mixture of water (15 ml.) and methanesulfonic acid (2 ml.) by warming, concentrated hydrochloric acid (4 ml.) is added, and the solution allowed to stand. The solid which precipitates is collected and dried. The yield of (3,5-diamino-6-chloropyrazinoyl)guanidine hydrochloride dihydrate is 36%, M.P. 295° C. (dec.). This material exhibits identical chromatographic behavior, infrared spectra and shows no mixed melting point depression with a sample prepared by another method.

Example 85

3,5 - diamino - 6 - chloropyrazinoylguanidine hydrochloride dihydrate.—Sodium (0.09 g., 0.004 mole) is dissolved in absolute ethanol (10 ml.) and guanidine hydrochloride (0.382 g., 0.004 mole) is added. This mixture is stirred one half hour, N-(t-butyl)-3-methyl-3-(3,5-diamino - 6 - chloropyrazinoyloxy)acrylamide (0.300 g., 0.0009 mole) is added and the mixture is refluxed for one hour. The reaction mixture is cooled, diluted with water (25 ml.) and acidified with dilute hydrochloric acid. The solid which separates on standing is collected and dried to yield 0.15 g. (60%) of (3,5-diamino-6-chloropyrazinoyl)guanidine hydrochloride dihydrate, M.P. 295° C. (dec.).

Example 86

1 - (3,5 - diamino - 6 - chloropyrazinoyl) - 3 - isopropylideneaminoguanidine.—A mixture of 3,5-diamino-6-chloropyrazinoic acid (3.80 g., 0.02 mole) and triethylamine (2.0 g., 0.02 mole) in dimethylformamide (40 ml.) is stirred for 10 minutes. To this solution is added N - (t - butyl) - 5 - methylisoxazolium perchlorate (4.80 g., 0.02 mole) and the resulting solution is stirred for one hour. A solution of isopropylideneaminoguanidine (9.12 g., 0.08 mole) in dimethylformamide (20 ml.) is added and the reaction mixture is stirred at room temperature for 18 hours. Water (250 ml.) is added and the solid which precipitates is collected and dried. The yield of 1-(3,5-diamino - 6 - chloropyrazinoyl) - 3 - isopropylideneaminoguanidine is 4.35 g. (76%); M.P. 171–8° C. Recrystallization from acetonitrile gives light yellow crystals, M.P. 183–6° C.

Analysis.—Calc'd for $C_9H_{13}ClN_6O$ (percent): C, 37.96; H, 4.60; N, 39.36. Found (percent): C, 38.01; H, 4.65; N, 39.15.

Example 87

1 - (3,5 - diamino - 6 - chloropyrazinoyl)-3-hydroxyguanidine.—Sodium (1.0 g., 0.044 mole) is dissolved in refluxing isopropyl alcohol (200 ml.). Hydroxyguanidine sulfate hydrate (6.38 g., 0.024 mole) is added and this mixture is refluxed for one hour. N-(t-butyl)-3-methyl-3-(3,5-diamino-6-chloropyrazinoyloxy)acrylamide (6.54 g., 0.02 mole) is added, refluxing is continued for one hour, and then the mixture is cooled and filtered. The yellow solid is washed with water and isopropyl alcohol and dried to give 2.75 g. (56%) of 1-(3,5-diamino-6-chloropyrazinoyl)-3-hydroxyguanidine, M.P. 188–200° C. (effervescence). Recrystallization from dimethylformamide-water gives material melting at 200–202° C. (dec.).

Analysis.—Calc'd for $C_6H_8ClN_7O_2$ (percent): C, 29.34; H, 3.28; N, 39.92. Found (percent): C, 29.42; H, 3.25; N, 40.01.

Example 88

1 - (3,5 - diamino - 6 - chloropyrazinoyl) -3 - benzyloxyguanidine.—A solution of N-(t-butyl)-3-methyl-3-(3,5-diamino-6-chloropyrazinoyloxy)acrylamide (1.08 g., 0.0033 mole) and benzyloxyguanidine (1.1 g., 0.0067 mole) in tetrahydrofuran (30 ml.) is refluxed for 48 hours. The solvent is removed under reduced pressure and isopropyl alcohol (20 ml.) is added to the residue. The solid present is collected and dried, 0.95 g., M.P. 105–110° C., resolidifies, and remelts about 160° C. Recrystallization from benzene gives light yellow crystals of 1-(3,5-diamino-6-chloropyrazinoyl) - 3 - benzyloxyguanidine, M.P. 163–6° C.

Calc'd for $C_{13}H_{14}ClN_7O_2$ (percent): C, 46.50; H, 4.20; N, 29.21. Found (percent): C, 46.72; H, 4.23; N, 29.45.

Employing the process described in Examples 84 and 86 but substituting for the pyrazinoic acid, the isoxazolium salt and the guanidine used therein equivalent amounts of 3-amino-5-NR¹R²-6-halopyrazinoic acid, N-R⁵-5-R³-4-R⁴-isoxazolium salt and a guanidine represented by

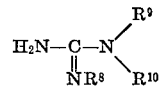

respectively, described in Table V, there are produced the 1 - (3-amino-5-NR¹R²-6-halopyrazinoyl)-2-R⁸-3-R⁹-3-R¹⁰-guanidines also described in Table V.

Alternatively, the pyrazinolyguanidines described in Table V are prepared by employing the process of Examples 85 and 87 but substituting for the pyrazinoyloxyacrylamides and guanidines used therein, equivalent amounts of N-R⁵-2-R⁴-3-R³-3-(3-amino-5-NR¹R²-6-halopyrazinolyoxy)-acrylamide and a guanidine of formula

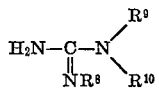

TABLE V.—Continued

| | R¹ | R² | R³ | R⁴ | R⁵ | R⁸ | R⁹ | R¹⁰ | halo |
|---|---|---|---|---|---|---|---|---|---|
| 106 | H | H | do | H | do | H | —CH₂—C₆H₄—OCH₃ | H | Cl |
| 107 | H | H | do | H | do | H | —(CH₂)₂N(morpholino) | H | Cl |
| 108 | H | H | do | H | do | H | —CH₂—(furyl) | H | Cl |
| 109 | H | H | do | H | do | H | C₆H₄—F | H | Cl |
| 110 | H | H | do | H | do | H | C₆H₄—CH₃ | H | Cl |
| 111 | H | H | do | H | do | H | C₆H₄—OCH₃ | H | Cl |
| 112 | H | H | do | H | do | H | —CH₃ | —(CH₂)₂—O—(CH₂)₂— | n-C₄H₉ | Cl |
| 113 | H | H | do | H | do | H | —OCH₃ | H | Cl |
| 114 | H | H | do | H | do | H | —OCH₂—C₆H₅ | H | Cl |
| 115 | CH₃— | CH₃— | do | H | do | H | —OCH₂—C₆H₅ | H | Cl |
| 116 | Same | Same | do | H | do | H | —OH | H | Cl |
| 117 | do | do | do | H | do | H | —OCH₃ | H | Cl |
| 118 | H | H | do | H | do | H | —[CH(CH₃)CH₂]₂—(CH₂)₃— | CH₃ | Cl |
| 119 | H | H | do | H | do | H | | H | Cl |
| 120 | H | H | do | H | do | H | | H | Cl |

PREPARATION OF PYRAZINAMIDO-GUANIDINES

EXAMPLE 121

1 - (3,5 - diamino-6-chloropyrazinamido)guanidine.—A mixture of 3,5-diamino-6-chloropyrazinoic acid (1.90 g., 0.01 mole) and triethylamine (1.0 g., 0.01 mole) in dimethylformamide (20 ml.) is stirred for 10 minutes. N(t-butyl)-5-methyl-isoxazolium perchlorate (2.40 g., 0.01 mole) is added and the resulting solution is stirred for one hour.

Sodium (1.04 g., 0.045 mole) is dissolved in absolute ethanol (50 ml.). Aminoguanidine hydrochloride (5.5 g., 0.05 mole) is added and the mixture stirred for three-quarters of an hour. The mixture is filtered and the filtrate evaporated under reduced pressure. The residue is mixed with dimethylformamide (10 ml.) and added to the above solution. This reaction mixture is stirred for 24 hours and the solvent removed under reduced pressure. Water (100 ml.) is added and the solid which separates is collected. The solid is dissolved in water by the addition of dilute methanesulfonic acid, treated with charcoal, and filtered. The filtrate is rendered alkaline by the addition of dilute sodium hydroxide solution and chilled. The solid which precipitates is collected and dried, to give 1-(3,5-diamino-6-chloropyrazinamido)guanidine, M.P. 281–2° C. (dec.). This material exhibits identical chromatographic behavior, infra red spectra and shows no mixed melting point depression with a sample prepared by another method.

EXAMPLE 122

1 - (3,5 - diamino - 6 - chloropyrazinamido)-3-benzylguanidine.—Employing substantially the process as described in Example 121 but substituting therein an equivalent amount of 1-amino-3-benzylguanidine hydroiodide, there is produced 1 - (3,5 - diamino-6-chloropyrazinamido)-3-benzylguanidine which liquifies at 120–130° C., resolidifies above 200° C., and then has M.P. 243–6° C. (dec.).

*Analysis.*—Calc'd for C₁₃H₁₅ClN₈O (percent): C, 46.60; H, 4.52; N, 33.48. Found (percent): C, 46.24; H, 4.73; N, 33.47.

EXAMPLE 123

1 - (3,5 - diamino - 6 - chloropyrazinamido)-3-aminoguanidine hydrate.—Sodium (0.50 g., 0.022 mole) is dissolved in refluxing isopropyl alcohol (100 ml.). 1,3-diaminoguanidine hydroiodide (5.25 g., 0.024 mole) is added and the reaction mixture is refluxed for one hour. N - (t - butyl)-3-methyl-3-(3,5-diamino-6-chloropyrazinoyloxy)acrylamide (3.27 g., 0.01 mole) is added and the mixture is refluxed for one hour. The yellow solid which separates is collected, washed with water, and dried, 1.94 g. (70%), M.P. gradual decomposition with effervesence over 185° C. This sample is purified by dissolving in dilute hydrochloric acid and reprecipitating by the addition of concentrated ammonium hydroxide solution, to give 1-(3,5 - diamino - 6-chloropyrazinamido)-3-aminoguanidine hydrate, M.P. 196–200° C. with effervescence.

*Analysis.*—Calc'd for $C_6H_{10}ClN_9O \cdot H_2O$ (percent): C, 25.95; H, 4.36; N, 45.40. Found (percent): C, 26.17; H, 4.44; N, 45.87.

Example 124

1-(3,5-diamino-6-chloropyrazinamido) - 2,3 - ethyleneguanidine.—Employing the procedure substantially as described in Example 123 but substituting for the 1,3-diaminoguanidine hydroiodide used therein an equivalent amount of 2-hydrazino-2-imidazoline hydroiodide, there is produced 1-(3,5-diamino - 6 - chloropyrazinamido)-2,3-ethyleneguanidine, M.P. 250–1° C. (dec.).

*Analysis.*—Calc'd for $C_8H_{11}ClN_8O$ (percent): C, 35.49; H, 4.10. Found (percent): C, 35.36; H, 4.17.

Employing the method substantially as described in Examples 121 and 123 but substituting for the pyrazinoic acid or pyrazinoyloxyacrylamide and the aminoguanidines used therein, equivalent amounts of 3-amino-5-$NR^1R^2$-6-halopyrazinoic acid or N-$R^5$-2-$R^4$-3-$R^3$-3-(3-amino-5-$NR^1R^2$-6-halopyrazinoyloxy)acrylamide and 1-amino-2-$R^{13}$-3-$R^{11}$-3-$R^{12}$-guanidine described in Table VI, there are produced the 1-(3-amino-5-$NR^1R^2$-6-halopyrazinamido)-2-$R^{13}$-3-$R^{11}$-3-$R^{12}$-guanidines also described in Table VI.

tion of sodium (0.23 g., 0.01 mole) in isopropyl alcohol (100 ml.) and this mixture is refluxed with stirring for one-half hour. N-(t-butyl)-3-(3,5-diamino-6-chloropyrazinecarbonyloxy)crotonamide (3.27 g., 0.01 mole) is added and the reaction mixture is refluxed an additional hour. The yellow solid is filtered from the hot solution, dissolved in water (100 ml.) and filtered. The filtrate is acidified with dilute hydrochloric acid and the solid that separates is collected and dried. The yield of N-cyano-3,5-diamino-6-chloropyrazinecarboxamide is 1.50 g. (71%), M.P. >330° C′ Purification is effected by recrystallization from nitromethane.

*Analysis.*—Calc'd for $C_6H_5ClN_6O$ (percent): C, 33.89; H, 2.37; N, 39.53. Found (percent): C, 33.94; H, 2.50; N, 39.48.

Example 133

1-(3,5-diamino-6-chloropyrazinoyl) - 5 - benzyloxybiguanide.—A mixture of N-t-butyl-3-methyl-3-(3,5-diamino-6-chloropyrazinecarbonyloxy)acrylamide (3.27 g., 0.01 mole) and 1-benzyloxybiguanide (3.30 g., 0.016 mole) in tetrahydrofuran (90 ml.) is refluxed for 24 hours. The tetrahydrofuran is removed under reduced pressure and the residue is washed out with isopropyl alcohol to yield 2.9 g., M.P. 180–191° C. Recrystallization from acetonitrile gives 1-(3,5-diamino-6-chloropyrazinoyl)-5-benzyloxybiguanide, M.P. 198–199° C.

*Analysis.*—Calc'd for $C_{14}H_{16}ClN_9O_2$ (percent): C, 44.50; H, 4.27; N, 33.37. Found (percent): C, 44.68; H, 4.32; N, 33.90.

Employing the procedure of Example 133 but substituting for the 1-benzyloxybiguanide and the N-t-butyl-3-methyl-3-(3,5-diamino - 6 - chloropyrazinecarbonyloxy) acrylamide utilized therein, substantially equivalent amounts of the N-t-butyl - 3 - methyl - 3 - (3-amino-5-$NR^1R^2$-6-chloropyrazinecarbonyloxy)acrylamides and the

TABLE VI

| | $R^1$ | $R^2$ | $R^3$ | $R^4$ | $R^5$ | $R^{11}$ | $R^{12}$ | $R^{13}$ | halo |
|---|---|---|---|---|---|---|---|---|---|
| Example: | | | | | | | | | |
| 125 | $CH_3$— | $CH_3$— | $CH_3$— | H | $(CH_3)_3C$— | H | —$CH_3$ | H | Cl |
| 126 | 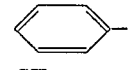 | H | Same | H | Same | H | —$CH_2CH_2OH$ | H | Cl |
| 127 | $CF_3CH_2$— | H | 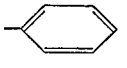 | H | ...do | H |  | H | Cl |
| 128 | H | H | $CH_3$— | H | ...do | $CH_3$— | —$CH_3$ | H | Cl |
| 129 | H | H | Same | H | ...do | n-$C_4H_9$— | —H | H | Cl |
| 130 | H | H | ...do | H | ...do | H | —$C_3H_7$-n | H | Cl |
| 131 | H | H | ...do | H | ...do | H | —$CH_2$—$CH_2$— | H | Cl |

Example 132

N - cyano-3,5-diamino-6-chloropyrazinecarboxamide.—Cyanamide (0.50 g., 0.012 mole) is added to a hot solusubstituted biguanides described in Table VII there are produced the 1-(3-amino-5-$NR^1R^2$-6-chloropyrazinoyl)-5-substituted biguanides also described in Table VII.

TABLE VII

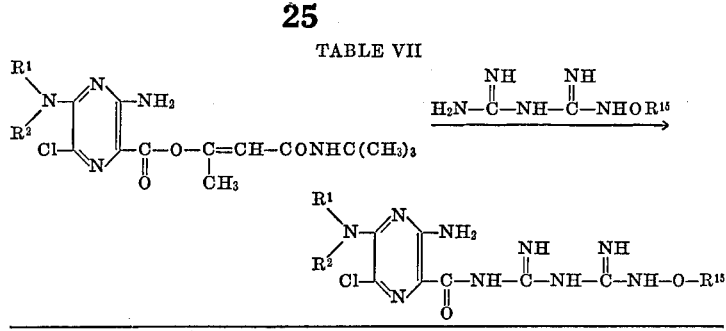

| Example: | Starting material from example number | R¹ | R² | R¹⁵ |
|---|---|---|---|---|
| 134 | 27 | cyclopentyl | H | —CH₂—C₆H₄—CH(CH₃)₂ |
| 135 | 29 | (CH₃)₂N(CH₂)₂— | H | —CH₂—C₆H₄—CH₃ |
| 136 | 30 | HO(CH₂)₂— | H | —CH₂—C₆H₄—Br |
| 137 | 33 | C₆H₅—CH₂— | H | —CH₂—C₆H₄—Cl |
| 138 | 35 | furfuryl (O-CH₂—) | H | —CH₂—C₆H₃(Cl)—Cl |
| 139 | 36 | C₆H₅— | H | —CH₂—C₆H₄—NO₂ |
| 140 | 40 | —(CH₂)₄— | | —CH₃ |
| 141 | 22 | H | H | —C₂H₅ |
| 142 | 22 | H | H | —n-C₃H₇ |
| 143 | 22 | H | H | —i-C₄H₉ |
| 144 | 22 | H | H | —n-C₅H₁₁ |
| 145 | 22 | H | H | —n-C₆H₁₃ |

Example 146

N-(2-thiazolin-2-yl)-3,5-diamino-6-chloropyrazinecarboxamide hydrochloride hemihydrate.—A mixture of 2-amino-2-thiazoline (4.08 g., 0.04 mole), N-(t-butyl)-3-methyl - 3 - (3,5-diamino-6-chloropyrazinecarbonyloxy) acrylamide (3.27 g., 0.01 mole) and tetrahydrofuran (70 ml.) is heated under reflux for 24 hours. The reaction mixture is chilled and a small amount of insoluble material is filtered off and discarded. The filtrate is evaporated to dryness and the residue is dissolved in water (50 ml.) by the addition of dilute methanesulfonic acid (6 N, 1.5 ml.). Concentrated hydrochloric acid (5 ml.) is added and the mixture set aside until crystallization appears complete. The solid is collected and dried, 0.86 g. (27%), M.P. >340° C. Recrystallization from aqueous ethanol gives the N - (2 - thiazolin-2-yl)-3,5-diamino-6-chloropyrazinecarboxamide hydrochloride hemihydrate, M.P. >340° C.

Analysis. — Calc'd for $C_8H_9ClN_6OS(HCl, \frac{1}{2}H_2O)$ (percent): C, 30.19; H, 3.49; N, 26.41. Found (percent): C, 30.35; H, 3.64; N, 26.22.

Employing the procedure of Example 146 but substituting for the 2-amino-2-thiazoline and n-t-butyl-3-methyl - 3 - (3,5-diamino-6-chloropyrazinecarbonyloxy) acrylamide used therein, equivalent amounts of the substituted 2-amino-2-thiazolines and the N-t-butyl-3-methyl-3 - (3 - amino - 5-NR¹R²-6-chloropyrazinecarbonyloxy) acrylamides described in Table VIII, there are produced the N-(substituted 2 - thiazolin - 2 - yl)-3-amino-5-NR¹R²-6-chloropyrazinecarboxamides also described in Table VIII.

TABLE VIII

| Example· | R¹ | R² | R¹⁶ | R¹⁷ | R¹⁸ |
|---|---|---|---|---|---|
| 147 | cyclopentyl | H | CH₃— | H | H |
| 148 | HO(CH₂)₂— | H | H | H | CH₃— |
| 149 | C₆H₅—CH₂— | H | H | H | n-C₆H₁₃— |
| 150 | —(CH₂)₄— | | CH₃— | CH₃— | H |

Example 151

N - (2 - pyridyl) - 3-amino-5-dimethylamino-6-chloropyrazinecarboxamide.—A mixture of sodium hydride (1.72 g., 0.04 mole, 56% in mineral oil) and 2-aminopyridine (3.76 g., 0.04 mole) in tetrahydrofuran (200 ml.) is stirred at room temperature until hydrogen evolution ceases. N-(t-butyl)-3-methyl-3-(3-amino-5-dimethylamino-6-chloropyrazinecarbonyloxy)acrylamide 7.06 g., 0.02 mole) is added and this mixture stirred for 24 hours. The reaction mixture is diluted with water (500 ml.) and extracted with ethyl acetate (3 × 200 ml.). The ethyl acetate is removed under reduced pressure and the oily residue is dissolved in acetonitrile (75 ml.) and diluted with water (125 ml.). The yellow solid that separates is collected, washed with water, and dried, 1.52 g., M.P. 130–136° C. Recrystallization from acetonitrile does not change the melting point.

*Analysis.*—Calc'd for $C_{12}H_{13}ClN_6ClN_6O$ (percent): C, 49.23; H, 4.48; N, 28.71. Found (percent): C, 49.33; H, 4.64; N, 28.55.

Employing the procedure of Example 151 but substituting for the 2-aminopyridine and N-t-butyl-3-methyl-3-(3-amino-5-dimethylamino - 6 - chloropyrazinecarbonyloxy) acrylamide utilized therein the amine $H_2NR^6$ and N-t-butyl - 3 - methyl-3-(3-amino-5-$NR^1R^2$-6-chloropyrazine-carbonyloxy)acrylamide described in Table IX there are produced the correspondingly N-substituted - 3 - amino-5-$NR^1R^2$ - 6 - chloropyrazinecarboxamides also described in Table IX.

TABLE IX

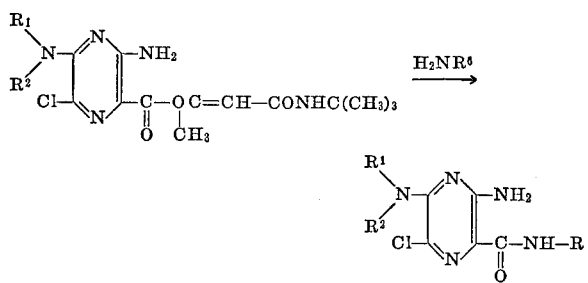

| | $R^1$ | $R^2$ | $R^6$ | M.P., °C. |
|---|---|---|---|---|
| Example: | | | | |
| 152 | H | H |  | 237–240 |
| 153 | H | H | 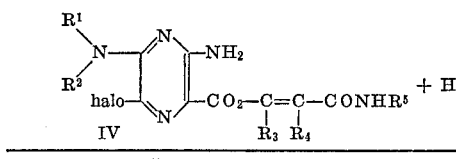—$C_6H_5$ | >300 |
| 154 | H | H | —$CH_3$ (thiazole) | 237–238 |
| 155 | $CH_3$— | $CH_3$— | (pyrazine) | 186–189 |
| 156 | H | H | 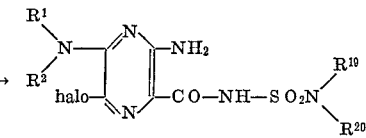 (pyridyl) | [1] 267–269 |

[1] Decomposition.

Example 157

(3,5-diamino-6-chloropyrazinoyl)sulfamide.—To a mixture of sulfamide (0.22 mole) and triethylamine (0.44 mole) in acetonitrile (150 ml.) is added in one portion N - (t - butyl) - 3 - methyl - 3 - (3,5 - diamino - 6 -1 chloropyrazinoyloxy)acrylamide (0.2 mole) with stirring at ambient temperature. After about 50 minutes, the resulting solution is diluted with ice water (250 ml.) and neutralized with acetic acid and the solid which separates is collected and dried giving (3,5-diamino-6-chloropyrazinoyl)sulfamide, M.P. 193.5–194.5° C.

The above procedure can be employed to prepare other pyrazinoylsulfamide products as illustrated by those described in the following table. The pyrazinoyloxyacrylamide identified in Table X is substituted for that employed in Example 157 above and is reacted with the sulfamide also identified in Table X to provide the desired pyrazinoylsulfamide having the $R^1$, $R^2$, $R^{19}$, $R^{20}$ and halo substituents identified in Table X.

TABLE X

| | $R^1$ | $R^2$ | halo | $R^3$ | $R^4$ | $R^5$ | $R^{19}$ | $R^{20}$ |
|---|---|---|---|---|---|---|---|---|
| Example No. | | | | | | | | |
| 158 | CH≡C—CH$_2$— | H | Cl | CH$_3$— | H | (CH$_3$)$_3$C— | H | H |
| 159 | CH$_2$=CH—CH$_2$— | H | Cl | —CH=CH—CH=CH— | | CH$_3$— | H | H |
| 160 | H | H | I | $^{\ominus}O_3S$—C$_6$H$_4$— | H | C$_2$H$_5$— | CH$_3$— | H |
| 161 | H | H | Br | C$_6$H$_5$— | H | (CH$_3$)$_3$C— | Same | CH$_3$— |
| 162 | (cyclopentyl-H) | H | Cl | CH$_3$— | H | Same | H | H |
| 163 | (cyclopentyl-H)—CH$_2$— | H | Cl | $^{\ominus}O_3S$—C$_6$H$_4$— | H | C$_2$H$_5$— | H | H |
| 164 | (CH$_3$)$_2$—N—(CH$_2$)$_2$— | H | Cl | CH$_3$— | H | (CH$_3$)$_3$C— | H | H |
| 165 | HO—(CH$_2$)$_2$— | H | Cl | Same as above | H | Same | H | H |
| 166 | HO—CH$_2$(CHOH)$_4$CH$_2$— | H | Cl | —CH=CH—CH=CH— | | CH$_3$— | H | H |
| 167 | H$_3$CCH$_2$— | H | Cl | C$_6$H$_5$— | H | (CH$_3$)$_3$C— | H | H |
| 168 | C$_6$H$_5$CH$_2$— | H | Cl | CH$_3$— | H | Same | C$_6$H$_5$CH$_2$— | H |

TABLE X—Continued

| | $R^1$ | $R^2$ | halo | $R^3$ | $R^4$ | $R^5$ | $R^{19}$ | $R^{20}$ |
|---|---|---|---|---|---|---|---|---|
| 169 | 2-fluorobenzyl (F-C$_6$H$_4$-CH$_2$-) | H | Cl | $^{\ominus}$O$_3$S-C$_6$H$_4$-I | H | C$_2$H$_5$- | H | H |
| 170 | furfuryl (furan-CH$_2$-) | H | Cl | CH$_3$- | H | (CH$_3$)$_3$C- | H | H |
| 171 | C$_6$H$_5$- | H | Cl | Same | H | Same | C$_6$H$_5$- | H |
| 172 | Cl-C$_6$H$_4$- | H | Cl | -CH=CH-CH=CH- | | CH$_3$- | H | H |
| 173 | CH$_3$O- | CH$_3$- | Cl | C$_6$H$_5$- | H | (CH$_3$)$_3$C- | C$_2$H$_5$- | H |
| 174 | H$_2$N- | Same | Cl | CH$_3$- | H | Same | H | H |
| 175 | (CH$_2$)$_4$ | | Cl | Same | H | ...do... | H | H |

Other compounds prepared by the novel process of this invention are described in Table XI. Each is prepared substantially by the method indicated in Table XI, by reaction between the amine reactant HNR$^6$R$^{14}$ described in the table and the N-(t-butyl)-3-methyl-3-(3-amino-5-NRR$^1$-6-chloropyrazinoyloxy)acrylamide also described in the table.

TABLE XI $$\text{R}^1\text{R}^2\text{N-pyrazine(NH}_2\text{)(Cl)-COOC(CH}_3\text{)=CH-CONHC(CH}_3\text{)}_3 + \text{HNR}^6\text{R}^{14} \longrightarrow \text{R}^1\text{R}^2\text{N-pyrazine(NH}_2\text{)(Cl)-CONR}^6\text{R}^{14}$$

| | $R^1$ | $R^2$ | $R^6$ | $R^{14}$ | Method of example No. | M.P.(° C.) |
|---|---|---|---|---|---|---|
| Example: | | | | | | |
| 176 | CH$_3$- | CH$_3$- | -CH$_2$COOC$_2$H$_5$ | H | 42 | |
| 177 | H | H | isoxazoline-C$_6$H$_5$ | H | 44 | 210–211 |
| 178 | H | H | -CH$_2$CONHNH-C(NH$_2$)=NH | H | 43 | $^1$310–313 |
| 179 | H | H | -CH$_2$CONH-C(NH$_2$)=NH | H | 43 | $^1$256–258 |
| 180 | H | H | -(CH$_2$)$_2$- | | 43 | $^1$179–181 |
| 181 | H | H | -(CH$_2$)$_2$-O-(CH$_2$)$_2$- | | 43 | 206.5–208.5 |
| 182 | H | H | -(CH$_2$)$_5$- | | 43 | 186.5–187.5 |
| 183 | H | H | -CH$_2$CH(OC$_2$H$_5$)$_2$ | -CH$_3$ | 43 | 116.5–118.5 |
| 184 | H | H | -CH$_2$CH(OC$_2$H$_5$)$_2$ | H | 43 | 146–148 |
| 185 | -(CH$_2$)$_2$N(CH$_3$)$_2$ | H | -NH-quinoline | H | 68 | 192–194 |
| 186 | -C$_2$H$_5$ | H | -NH-quinoline | H | 68 | 224–226 |
| 187 | H | H | -C(=NH)-NHCN | H | 85 | >300 |
| 188 | H | H | -C(=NH)-NH-NO$_2$ | H | 85 | >300 |
| 189 | H | H | -CH$_2$CN | CH$_3$- | 43 | 182–183 |
| 190 | H | H | -CH$_2$CONH(CH$_2$)$_2$-morpholine | H | 43 | 207–210 |
| 191 | H | H | -CH$_2$CONH(CH$_2$)$_2$-piperidine | H | 43 | |

3,577,418

TABLE XI—Continued

| | R¹ | R² | R⁶ | R¹⁴ | Method of example No. | M.P.(° C.) |
|---|---|---|---|---|---|---|
| 192 | H | H | —CH₂CONH—[CH₃—N⟨⟩N—(CH₂)₂]  | H | 43 | |
| 193 | H | H | —(CH₂)₂—N(CH₃)—(CH₂)₂— | | 43 | |
| 193a | H | H | —NH—(4-methylquinolin-2-yl) | H | 68 | ¹ 262–264 |

¹ Decomposition.

As mentioned previously, the compounds prepared by the process of this invention are useful diuretic and natriuretic agents. Because of the diversity of the compounds, although all are amide derivatives, they naturally present varying degrees of diuretic activity but within the dose limits mentioned below. They differ from most of the known, effective diuretic agents in that the compounds of this invention selectively enhance the excretion of sodium ions without causing an increase in excretion of potassium ions. The potassium ion loss, which is caused by known diuretics, often results in a severe muscular weakness. Since the compounds of this invention are essentially free of this potassium depletion, they have this decided advantage as diuretics. As diuretic agents, they can be used for the treatment of edema, hypertension and other diseases known to be responsive to this therapy.

It has also been found as another feature of this invention that when coadministered with other diuretic agents known to enhance the elimination of potassium ions along with sodium ions, the novel compounds will reduce the excretion of potassium ions and thus overcome this undesirable property of the other diuretic agents. The compounds of this invention, therefore, are useful in combination with other classes of diuretic agents in order to prevent the elimination of potassium ions which otherwise would be promoted by the other diuretics. In addition, the compounds of this invention are useful by themselves as diuretic and/or saluretic agents.

In some instances, it may be desirable to use a salt of these compounds, employing a pharmaceutically acceptable acid, and these salts are to be considered as included in this invention and in the scope of the claims.

The products of this invention can be administered to man or animals in the form of pills, tablets, capsules, elixirs, injectable preparations and the like and can comprise the only essential active ingredient of the pharmaceutical formulation or, as mentioned above, they can be combined in pharmaceutical formulations with other diuretic agents or, indeed, other therapeutic agents.

The compounds of this invention are advantageously administered at a dosage range of from about 5 mg./day to about 1000 mg./day or at a somewhat higher or lower dosage at the physician's discretion, preferably in subdivided amounts on a one to four times a day regimen.

The class of compounds which can be designated as pyrazinoylhydrazides generally do not spare potassium excretion to the same extent as the other compounds of this invention, but their diuretic and natriuretic activity is of approximately the same order, the effective dose being in the range of 5 mg./day to about 1000 mg./day.

The actual dose required of any of the products of the process of this invention depends on the degree of activity of the particular compound, the age, physical condition and seriousness of the disorder being treated and must be determined by the practitioner administering the active agent.

Example 194

Dry filled capsule containing 10 mg. of active ingredient

| | Per capsule, mg. |
|---|---|
| 1 - (3,5 - diamino - 6 - chloropyrazinoyl)-3-hydroxyguanidine (from Example 87) | 10 |
| Lactose | 313 |
| Magnesium stearate | 2 |
| Mixed powders | 325 |

Mix the (3,5 - diamino - 6-chloropyrazinoyl)-guanidine hydrochloride, from Example 84, lactose, and magnesium stearate and reduce to a No. 60 mesh powder. Encapsulate, filling 325 mg. in each No. 2 capsule.

Example 195

Combination dosage form in dry filled capsule

| | Per capsule, mg. |
|---|---|
| 1 - (3,5 - diamino - 6-chloropyrazinoyl)-3-benzyloxyguanidine (from Example 88) | 15 |
| Hydrochlorothiazide | 50 |
| Magnesium stearate | 2 |
| Lactose | 258 |
| Mixed powders | 325 |

Mix all of the above ingredients, reduce to a No. 60 mesh powder and encapsulate, filling 325 mg. in each No. 2 capsule.

Example 196

Dry filled capsule containing 10 mg. of active ingredient

| | Per capsule, mg. |
|---|---|
| 1 - (3,5-diamino - 6 - chloropyrazinamido) - 2,3-ethyleneguanidine (from Example 124) | 10 |
| Lactose | 263 |
| Magnesium stearate | 2 |
| Mixed powders | 275 |

Mix the (3,5-diamino - 6 - chloropyrazinamido) guanidine, lactose, and magnesium stearate and reduce to a No. 60 mesh powder. Encapsulate, filling 275 mg. in each No. 2 capsule.

Example 197

Dry filled capsule containing 50 mg. of active ingredient

| | Per capsule, mg. |
|---|---|
| N-(3,5-diamino - 6 - chloropyrazinoyl)benzamidine from Example 83) | 50 |
| Lactose | 273 |
| Magnesium stearate | 2 |
| Mixed powders | 325 |

Mix the N-(3,5-diamino-6-chloropyrazinoyl)benzamidine, lactose, and magnesium stearate and reduce to a No. 60 mesh powder. Encapsulate, filling 325 mg. in each No. 2 capsule.

Example 198

Dry filled capsule containing 100 mg. of active ingredient

Per capsule, mg.

| | |
|---|---:|
| N-(2-thiazolin-2-yl)-3,5-diamino-6 - chloropyrazine-carboxamide hydrochloride hemihydrate (from Ex. 146) | 100 |
| Lactose | 223 |
| Magnesium stearate | 2 |
| Mixed powders | 325 |

Mix all of the above ingredients, reduce to a No. 60 mesh powder and encapsulate, filling 325 mg. in each No. 2 capsule.

Example 199

Dry filled capsule containing 50 mg. of active ingredient

Per capsule, mg.

| | |
|---|---:|
| 3,5-diamino-6-chloropyrazinoic acid 2-(2-quinolinyl) hydrazide (from Example 82) | 50 |
| Lactose | 273 |
| Magnesium stearate | 2 |
| Mixed powders | 325 |

Mix all of the above ingredients, reduce to a No. 60 mesh powder and encapsulate, filling 325 mg. in each No. 2 capsule.

What is claimed is:

1. A process for the preparation of a compound of structural formula

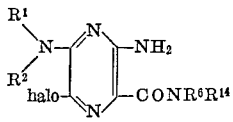

which comprises the reaction of a compound of structural formula

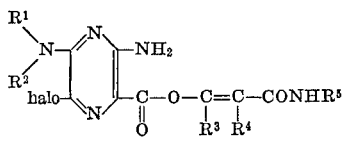

with a compound of structural formula

wherein $R^1$ is a member selected from the group consisting of
  (1) hydrogen,
  (2) lower alkyl,
  (3) lower alkenyl,
  (4) lower alkynyl,
  (5) $C_{3-6}$ cycloalkyl,
  (6) $C_{3-6}$ cycloalkyl-lower alkyl
  (7) di(lower alkyl)amino-lower alkyl,
  (8) hydroxy-lower alkylmethyl,
  (9) polyhydroxy-lower alkylmethyl,
  (10) $\omega,\omega,\omega$-trifluoro-lower alkyl,
  (11) phenyl-lower alkyl,
  (12) halophenyl-lower alkyl,
  (13) furyl-lower alkyl,
  (14) phenyl,
  (15) halophenyl,
  (16) lower alkoxy, and
  (17) amino;

$R^2$ is a member selected from the group consisting of
  (1) hydrogen, and
  (2) lower alkyl;

$R^1$ and $R^2$, when each represents lower alkyl, can be linked together to form an azacyclic structure with the nitrogen atom to which they are attached;

$R^3$ is a member selected from the group consisting of
  (1) lower alkyl,
  (2) phenyl, and

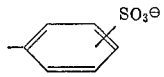

$R^4$ is a member selected from the group consisting of
  (1) hydrogen,
  (2) a hydrocarbon radical which when linked with $R^3$ forms an o-phenylene group with the carbons to which $R^3$ and $R^4$ are attached;

halo is a member selected from the group consisting of
  (1) chloro,
  (2) bromo; and
  (3) iodo;

$R^6$ is a member selected from the group consisting of
  (1) lower alkyl,
  (2) mono(lower alkoxy)methyl-lower alkyl,
  (3) di(lower alkoxy)methyl-lower alkyl,
  (4) cyano-lower alkyl,
  (5) lower alkoxycarbonyl-lower alkyl,
  (6) phenyl-lower alkyl,
  (7) guanidinocarbonyl-lower alkyl,
  (8) guanidinoaminocarbonyl-lower alkyl,
  (9) heterocyclic-lower alkyl-aminocarbonyl - lower alkyl, wherein the heterocycle is linked through a nuclear nitrogen atom and contains up to 1 other nuclear hetero atom selected from oxygen and nitrogen, which when nitrogen is substituted with hydrogen or lower alkyl,
  (10) di(lower alkyl)aminomethyl-lower alkyl,
  (11) 2-(2-imidazolinyl)aminomethyl-lower alkyl,
  (12) heterocyclic-lower alkyl wherein the heterocycle is of 5 to about 8 nuclear members containing up to 2 heteroatoms selected from the oxygen and nitrogen, either unsubstituted or substituted with lower alkyl,
  (13) lower alkenyl,
  (14) lower alkynyl,
  (15) phenyl,
  (16) halophenyl,
  (17) lower alkyl-phenyl,
  (18) lower alkoxy-phenyl,
  (19) cyano,
  (20) amino,
  (21) di(lower alkyl)amino,
  (22) (phenyl-lower alkyl)(lower alkyl)amino,
  (23) pyridylamino,
  (24) pyrimidinylamino,
  (25) quinolinylamino,
  (26) heterocycle of from 5 to 8 nuclear members containing 1 nitrogen atom and up to 2 other hetero-atoms selected from sulfur, oxygen and nitrogen, and substituted with hydrogen, lower alkyl or phenyl, $R^{14}$ is a member selected from the group consisting of
  (1) hydrogen, and
  (2) lower alkyl;

$R^6$ and $R^{14}$ when lower alkyl can be linked together to form a 3 to 6 membered heterocycle with the nitrogen atom to which they are attached, containing up to 1 other hetero atom selected from oxygen and nitrogen; and $R^5$ is lower alkyl.

2. A process as claimed in claim 1, wherein the reaction is carried out in a polar organic solvent at a temperature in the range from ambient to about 150° C.

3. A process for the preparation of pyrazinamide compounds as claimed in claim 1 wherein $R^1$, $R^2$, $R^3$, $R^4$, $R^5$ and $R^{14}$ are as defined in claim 1 and $R^6$ represents

wherein $R^7$ is a member selected from the group consisting of
(1) lower alkyl,
(2) phenyl,
(3) halophenyl,
(4) lower alkyl-phenyl, and
(5) lower alkoxy-phenyl.

4. A process as claimed in claim 3, wherein the reaction is carried out in a polar organic solvent at a temperature in the range from ambient to about 150° C.

5. A process for the preparation of pyrazinamide compounds as claimed in claim 1 wherein $R^1$, $R^2$, $R^3$, $R^4$, $R^5$ and $R^{14}$ are as defined in claim 1 and $R^6$ represents

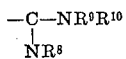

wherein $R^8$ is a member selected from the group consisting of
(1) hydrogen, and
(2) lower alkyl;

$R^9$ is a member selected from the group consisting of
(1) hydrogen,
(2) lower alkyl,
(3) hydroxy-lower alkyl,
(4) phenyl-lower alkyl,
(5) halophenyl-lower alkyl,
(6) lower alkyl-phenyl-lower alkyl,
(7) naphthyl-lower alkyl,
(8) heterocyclic-lower alkyl wherein the heterocycle is of 5–6 members and constains 1 nitrogen atom and up to 1 other hetero atom selected from oxygen and nitrogen,
(9) furyl-lower alkyl,
(10) lower alkoxy-lower alkyl,
(11) lower alkenyl,
(12) lower alkylideneamino,
(13) phenyl-lower alkylideneamino,
(14) hydroxy,
(15) phenyl,
(16) lower alkyl-phenyl,
(17) lower alkoxy-phenyl,
(18) halophenyl,
(19) lower alkoxyphenyl-lower alkyl,
(20) lower alkoxy,
(21) phenyl-lower alkoxy,
(22) cyano, and
(23) nitro;

$R^{10}$ is a member selected from the group consisting of
(1) hydrogen, and
(2) lower alkyl;

$R^9$ and $R^{10}$ when lower alkyl, can be linked together to form with the nitrogen atom to which they are attached, a heterocyclic ring;

$R^8$ and $R^9$ when lower alkyl, can be linked together to form with the nitrogen atoms to which they are attached, a heterocyclic ring.

6. A process as claimed in claim 5, wherein the reaction is carried out in a polar organic solvent at a temperature in the range from ambient to about 150° C.

7. A process for the preparation of pyrazinamide compounds as claimed in claim 1 wherein $R^1$, $R^2$, $R^3$, $R^4$, $R^5$ and $R^{14}$ are as defined in claim 1 and $R^6$ represents

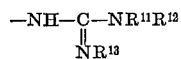

wherein $R^{11}$ represents a member selected from the group consisting of
(1) hydrogen, and
(2) lower alkyl;

$R^{12}$ is a member selected from the group consisting of
(1) hydrogen,
(2) lower alkyl,
(3) hydroxy-lower alkyl,
(4) phenyl-lower alkyl,
(5) phenyl, and
(6) amino;

$R^{13}$ is a member selected from the group consisting of
(1) hydrogen,
(2) a hydrocarbon radical which when linked with $R^{11}$ forms a diazacyclic ring with the nitrogens to which $R^{11}$ and $R^{13}$ are attached.

8. A process as claimed in claim 7, wherein the reaction is carried out in a polar organic solvent at a temperature in the range from ambient to about 150° C.

9. A process for the preparation of pyrazinamide compounds as claimed in claim 1 wherein $R^1$, $R^2$, $R^3$, $R^4$, $R^5$ and $R^{14}$ are as defined in claim 1 and $R^6$ represents

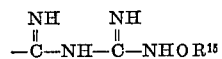

wherein $R^{15}$ is a member selected from the group consisting of
(1) benzyl,
(2) lower alkyl-benzyl,
(3) halobenzyl,
(4) nitrobenzyl, and
(5) lower alkyl.

10. A process as claimed in claim 9, wherein the reaction is carried out in a polar organic solvent at a temperature in the range from ambient to about 150° C.

11. A process for the preparation of pyrazinamide compounds as claimed in claim 1 wherein $R^1$, $R^2$, $R^3$, $R^4$, $R^5$ and $R^{14}$ are as defined in claim 1 and $R^6$ represents

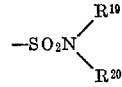

wherein $R^{19}$ is a member selected from the group consisting of
(1) hydrogen,
(2) lower alkyl,
(3) phenyl, and
(4) phenyl-lower alkyl; and $R^{20}$ is a member selected from the group consisting of
(1) hydrogen, and
(2) lower alkyl.

12. A process as claimed in claim 11, wherein the reaction is carried out in a polar organic solvent at a temperature in the range from ambient to about 150° C.

13. The process as claimed in 5 wherein $R^6$ is

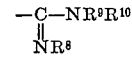

to yield a product of structural formula

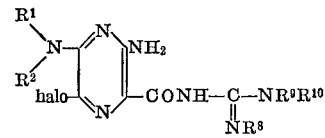

wherein $R^1$, $R^2$, $R^8$, $R^9$ and $R^{10}$ and halo have the meanings assigned to each of them in claim 5.

14. The process as claimed in claim 13, wherein $R^1$, $R^2$, $R^8$, $R^9$ and $R^{10}$ are each hydrogen, and halo represents chloro to yield (3,5-diamino-6-chloropyrazinoyl)-quanidine.

15. The process as claimed in claim 13, wherein $R^1$ and $R^2$ each represent methyl, $R^8$, $R^9$ and $R^{10}$ each represent hydrogen and halo represents chloro to yield (3-amino-5-dimethylamino-6-chloropyrazinoyl)quanidine.

16. The process as claimed in claim 7, wherein $R^6$ is

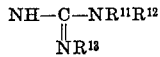

to yield a product of structural formula

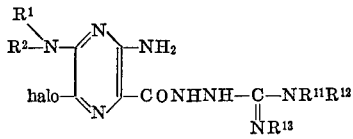

wherein $R^1$, $R^2$, $R^{11}$, $R^{12}$, $R^{13}$ and halo have the meanings assigned in claim 7.

17. The process as claimed in claim 16, wherein $R^1$, $R^2$, $R^{11}$, $R^{12}$ and $R^{13}$ each represents hydrogen, and halo represents chloro to yield (3,5-diamino-6-chloropyrazinamido)guanidine.

18. The process as claimed in claim 1 wherein $R^6$ is a member selected from the group consisting of
(1) lower alkyl,
(2) mono(lower alkoxy)methyl-lower alkyl,
(3) di(lower alkoxy)methyl-lower alkyl,
(4) cyano-lower alkyl,
(5) lower alkoxycarbonyl-lower alkyl,
(6) phenyl-lower alkyl,
(7) quanidinocarbonyl-lower alkyl,
(8) quanidinoaminocarbonyl-lower alkyl,
(9) heterocyclic-lower alkyl-aminocarbonyl-lower alkyl, wherein the heterocycle is linked through a nuclear nitrogen and contains up to 1 other nuclear hetero atom selected from oxygen and nitrogen, which when nitrogen is substituted with hydrogen or lower alkyl,
(10) di(lower alkyl)aminomethyl-lower alkyl,
(11) 2-(2-imidazolinyl)aminomethyl-lower alkyl,
(12) heterocyclic-lower alkyl wherein the heterocycle is of 5 to about 8 nuclear members containing up to 2 heteroatoms selected from oxygen and nitrogen, either unsubstituted or substituted with lower alkyl.
(13) lower alkenyl,
(14) lower alkynyl,
(15) phenyl,
(16) halophenyl,
(17) lower alkyl-phenyl,
(18) lower alkoxy-phenyl, and
(19) cyano, and $R^1$, $R^2$ and halo have the meanings assigned therein.

19. The process as claimed in claim 1, wherein $R^6$ is a member selected from the group consisting of
(1) amino,
(2) di(lower alkyl)amino,
(3) (phenyl-lower alkyl)(lower alkyl)amino,
(4) pyridylamino,
(5) pyrimidinylamino,
(6) quinolinylamino, and
(7) heterocycle of from 5 to 8 nuclear members containing 1 nitrogen atom and up to 2 other heteroatoms selected from sulfur, oxygen and nitrogen, and substituted with hydrogen, lower alkyl or phenyl, and $R^1$, $R^2$, $R^3$, $R^4$, $R^5$, $R^{14}$ and halo have the meanings assigned therein.

20. The process as claimed in claim 11. wherein $R^1$, $R^2$, $R^{14}$, $R^{19}$ and $R^{20}$ are hydrogen, and halo is chloro to produce 3,5-diamino-6-chloropyrazinoylsulfamide.

21. The process as claimed in claim 9, wherein $R^1$, $R^2$ and $R^{14}$ are hydrogen; halo is chloro; and $R^{15}$ is benzyl to produce 1-(3,5-diamino-6-chloropyrazinoyl)-5-benzyloxybiguanide.

22. The process as claimed in claim 1, wherein $R^6$ is

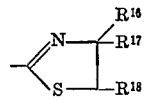

wherein $R^{16}$, $R^{17}$ and $R^{18}$ are separately selected from hydrogen, lower alkyl and phenyl.

23. The process as claimed in claim 22 wherein $R^1$, $R^2$, $R^{14}$, $R^{16}$, $R^{17}$ and $R^{18}$ are hydrogen and halo is chloro, to produce N-(2-thiazolin-2-yl)-3,5-diamino-6-chloropyrazincarboxamide.

24. The compound represented by structural formula

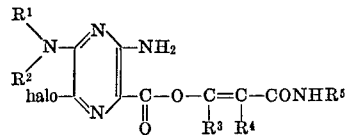

wherein $R^1$, $R^2$, $R^3$, $R^4$, $R^5$ and halo each have the meaning assigned to them in claim 1.

25. The compound as claimed in claim 24, wherein $R^1$, $R^2$ and $R^4$ each represents hydrogen, $R^3$ represents methyl, $R^5$ represents tertiary butyl, and halo represents chloro.

26. The compound as claimed in claim 24, wherein $R^1$, $R^2$ and $R^3$ each represents methyl, $R^4$ represents hydrogen, $R^5$ represents tertiary butyl, and halo represents chloro.

27. The compound of structural formula

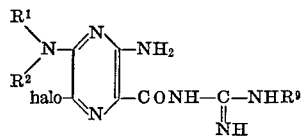

wherein $R^1$ and $R^2$ are members selected from the group consisting of hydrogen and lower alkyl; halo is a member selected from the group consisting of chloro, bromo, and iodo; and $R^9$ is a member selected from the group consisting of hydroxy, lower alkoxy, phenyl-lower alkoxy, cyano, and nitro.

28. 1-(3,5-diamino - 6 - chloropyrazinoyl)-3-hydroxyguanidine.

29. 1-(3-amino-5-dimethylamino - 6 - chloropyrazinoyl)-3-hydroxyguanidine.

30. 1-(3,5-diamino - 6 - chloropyrazinoyl)-3-methoxyguanidine.

31. 1-(3-amino-5-dimethylamino - 6 - chloropyrazinoyl)-3-methoxyguanidine.

32. 1-(3,5-diamino - 6 - chloropyrazinoyl)-3-benzyloxyguanidine.

33. 1-(3-amino-5-dimethylamino - 6 - chloropyrazinoyl)-3-benzyloxyguanidine.

34. 1-(3,5-diamino - 6 - chloropyrazinoyl)-3-cyanoguanidine.

35. 1-(3,5-diamino - 6 - chloropyrazinoyl)-3-nitroguanidine.

36. A compound of structural formula

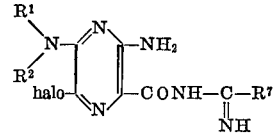

wherein $R^1$, $R^2$, and halo each have the meanings assigned to them in claim 1, and $R^7$ is a member selected from the group consisting of:
(a) lower alkyl,
(b) phenyl,
(c) halophenyl,
(d) lower alkyl-phenyl, and
(e) lower alkoxyphenyl.

37. A compound of structural formula

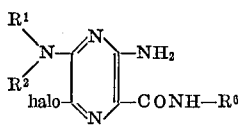

wherein $R^1$, $R^2$ and halo, each have the meanings assigned to them in claim 1, and $R^6$ is a member selected from the group consisting of:
(a) 1-pyrrolidinyl,
(b) hexahydro-1-azepinyl,
(c) piperidino,
(d) morpholino,
(e) pyridylamino,
(f) 2-pyrimidinylamino,
(g) 4-(3,5-diamino-1,2,4-triazolyl),
(h) N-lower alkyl-N-phenyl-lower alkylamino, and
(i) 2-quinolinylamino.

38. 3,5 - diamino-4-(3,5-diamino - 6 - chloropyrazinamido)-4H-1,2,4-triazole.

39. 3,5-diamino - 6 - chloropyrazinoic acid, 2-(2-quinolinyl)hydrazide.

40. 3-amino-5-dimethylaminoethylamino - 6 - chloropyrazinoic acid, 2-(2-quinolinyl)hydrazide.

41. A compound of structural formula

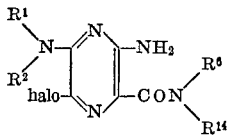

wherein $R^1$, $R^2$ and halo each have the meanings assigned to them in claim 1, and $R^6$ is a member selected from the group consisting of:
(a) mono(lower alkoxy)methyl-lower alkyl,
(b) phenyl-lower alkyl,
(c) phenyl,
(d) halophenyl,
(e) lower alkyl-phenyl,
(f) lower alkoxy-phenyl,
(g) lower alkoxycarbonyl-lower alkyl,
(h) cyano-lower alkyl,
(i) (2-imidazolin-2-yl)amino-lower alkyl,
(j) lower alkoxycarbonyl, and
(k) di(lower alkoxy)methyl-lower alkyl,
and $R^{14}$ is a member of the group consisting of hydrogen and lower alkyl.

42. A compound of structural formula

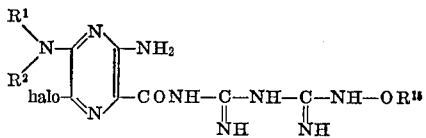

wherein $R^1$, $R^2$ and halo each have the meanings assigned to them in claim 1, and $R^{15}$ is a member of the group consisting of
(a) benzyl,
(b) lower alkyl-benzyl,
(c) halobenzyl,
(d) nitrobenzyl, and
(e) lower alkyl.

43. 1 - (3,5-diamino-6-chloropyrazinoyl)-5-benzyl-oxy-biguanide.

44. A compound of structural formula

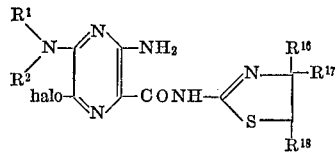

wherein $R^{16}$, $R^{17}$ and $R^{18}$ are members selected from the group consisting of hydrogen, and lower alkyl; and $R^1$, $R^2$ and halo have the meanings assigned in claim 1.

45. N-(2-thiazolin-2-yl)-3,5-diamino-6-chloropyrazine-carboxamide hydrochloride hemihydrate.

46. A compound of structural formula

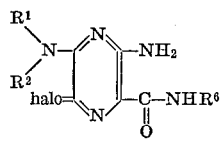

wherein $R^6$ is a member selected from the group consisting of
(a) thiazol-2-yl,
(b) 4-phenylthiazol-2-yl,
(c) 4-methylthiazol-2-yl,
(d) pyrimidin-2-yl,
(e) pyridin-4-yl,
(f) pyridin-2-yl, and
(g) 5-phenyloxazolin-2-yl, and $R^1$, $R^2$ and halo are as defined in claim 1.

47. The compound as claimed in claim 46, wherein halo is chloro and $R^1$ and $R^2$ are selected from hydrogen and lower alkyl.

48. A compound of structural formula

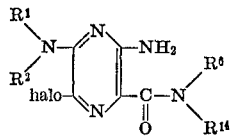

wherein $R^6$ and $R^{14}$ are taken together to form a heterocycle with the nitrogen to which they are attached selected from the group consisting of 1-aziridinyl, morpholino and piperidino, and $R^1$, $R^2$ and halo are as defined in claim 1.

49. The compound as claimed in claim 48, wherein halo is chloro, and $R^1$ and $R^2$ are selected from hydrogen and lower alkyl.

No. references cited.

NICHOLAS S. RIZZO, Primary Examiner

U.S. Cl. X.R.

260—247.2; 424—250

UNITED STATES PATENT OFFICE
CERTIFICATE OF CORRECTION

Patent No. 3,577,418            Dated May 4, 1971

Inventor(s) Edward J. Cragoe, Jr. and Kenneth L. Shepard

It is certified that error appears in the above-identified patent and that said Letters Patent are hereby corrected as shown below:

In column 2, line 62, change "o" to read ---to---. In column 4, line 16, change "$R^8$" to read ---$R^9$---. In column 11, line 13, correct "glycerinate" to read ---glycinate; in line 23, correct "acrylamine" to read ---acrylamide---. In column 18, line 1, in the empirical formula, correct "$N_6$" to read ---$N_8$---. In column 27, line 18, in the empirical formula, delete the second occurrence of "$ClN_6$"; in Table IX, line 40, that portion of the formula reading In column 28, line 34, correct "(3,5-diamino-6-1chlo-" to read ---(3,5-diamino-6-chlo- ---. In Table X, Example 167, in the column headed "$R^1$", change "$H_3CCH_2$" to read ---$F_3CCH_2$---. In column 35, line 15, the formula reading

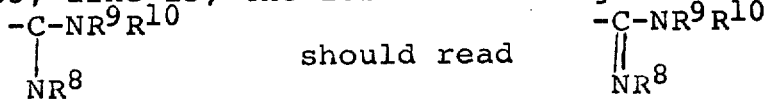

In column 37, line 5, add a single bond immediately preceding "N" in the structure. In column 40, line 25, Claim 46, in the structure, change "halo=" to read --- halo- ---.

Signed and sealed this 30th day of November 1971.

(SEAL)
Attest:

EDWARD M. FLETCHER, JR.          ROBERT GOTTSCHALK
Attesting Officer                  Acting Commissioner of Patents